(12) United States Patent
Rose et al.

(10) Patent No.: US 9,770,941 B2
(45) Date of Patent: Sep. 26, 2017

(54) WHEEL COVER ASSEMBLY

(71) Applicant: Lund, Inc., Buford, GA (US)

(72) Inventors: Brent L. Rose, Jefferson, GA (US); William Franklin Bibb, Buford, GA (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 14/600,993

(22) Filed: Jan. 20, 2015

(65) Prior Publication Data

US 2015/0210110 A1 Jul. 30, 2015

Related U.S. Application Data

(60) Provisional application No. 61/931,258, filed on Jan. 24, 2014.

(51) Int. Cl.
| | |
|---|---|
| *B60B 7/00* | (2006.01) |
| *B60B 7/06* | (2006.01) |
| *B60B 7/04* | (2006.01) |
| *B60B 7/08* | (2006.01) |
| *B60B 7/10* | (2006.01) |
| *B60B 7/12* | (2006.01) |

(52) U.S. Cl.
CPC ............ *B60B 7/063* (2013.01); *B60B 7/04* (2013.01); *B60B 7/08* (2013.01); *B60B 7/10* (2013.01); *B60B 7/12* (2013.01); *B60B 2900/1216* (2013.01); *B60Y 2200/14* (2013.01); *B60Y 2200/81* (2013.01); *Y10T 29/49542* (2015.01)

(58) Field of Classification Search
CPC .. B60B 7/063; B60B 7/04; B60B 7/12; B60B 7/10; B60B 7/08; B60B 7/00; B60B 7/06; B60B 7/061; B60B 7/065; B60B 7/066; B60B 7/068
See application file for complete search history.

(56) References Cited

U.S. PATENT DOCUMENTS

| | | | | |
|---|---|---|---|---|
| 3,773,390 | A | * 11/1973 | Foster | B60B 7/10 301/37.31 |
| 4,241,954 | A | * 12/1980 | Brown | B60B 7/12 220/321 |
| 4,363,520 | A | * 12/1982 | Connell | B60B 7/10 301/37.31 |
| 4,761,040 | A | 8/1988 | Johnson | |
| 5,135,289 | A | * 8/1992 | Fleck | B60B 7/14 301/37.102 |
| 5,263,770 | A | * 11/1993 | Goudey | B60B 7/04 301/108.4 |
| 5,324,099 | A | 6/1994 | Fitzhugh | |
| 5,358,313 | A | 10/1994 | Polka | |

(Continued)

*Primary Examiner* — James M Dolak
(74) *Attorney, Agent, or Firm* — Knobbe Martens Olson and Bear LLP

(57) ABSTRACT

The present disclosure relates to a wheel cover assembly for a wheel assembly of a vehicle. The wheel cover assembly can include a bracket configured to be mounted onto the wheel assembly, an outer ring configured to be coupled with the bracket, and an inner cover removably couplable with the outer ring. The inner cover can comprise at least one attachment mechanism having a spring element, a catch and a handle, where the spring element can bias the catch to engage with the bracket or the outer ring to removably secure the inner cover to the outer ring.

19 Claims, 34 Drawing Sheets

(56) References Cited

U.S. PATENT DOCUMENTS

| | | | |
|---|---|---|---|
| RE35,497 E * | 4/1997 | Carter, III | B60B 7/10 |
| | | | 301/37.31 |
| 5,770,797 A * | 6/1998 | Lapohn | B60C 23/02 |
| | | | 116/34 R |
| 5,823,635 A * | 10/1998 | Polka | B60B 7/008 |
| | | | 301/37.109 |
| 6,443,528 B1 * | 9/2002 | Polka | B60B 7/04 |
| | | | 301/37.101 |
| 6,595,596 B1 | 7/2003 | Polka | |
| 6,945,609 B2 * | 9/2005 | Barney | B60B 7/04 |
| | | | 301/37.105 |
| 7,059,684 B1 | 6/2006 | Polka | |
| 7,547,076 B2 | 6/2009 | Necaise | |
| 7,758,131 B1 * | 7/2010 | Wolf | B60B 3/044 |
| | | | 301/37.102 |
| 7,806,484 B1 * | 10/2010 | Young | B05B 15/0487 |
| | | | 301/37.104 |
| 8,382,210 B1 | 2/2013 | Fleck | |
| 9,114,874 B1 * | 8/2015 | Danto | B64C 25/36 |
| 9,199,508 B2 * | 12/2015 | Kronemeyer | B60B 7/06 |
| 9,365,074 B2 * | 6/2016 | Polka | B60B 7/14 |
| 9,511,624 B2 * | 12/2016 | Polka | B60B 7/14 |
| 9,517,656 B2 * | 12/2016 | von Roenne | B60B 7/08 |
| 9,561,687 B2 * | 2/2017 | Polka | B60B 7/04 |
| 2011/0101767 A1 | 5/2011 | Fleck | |
| 2012/0043803 A1 | 2/2012 | Grill et al. | |
| 2012/0212035 A1 | 8/2012 | Fleck | |
| 2013/0015698 A1 * | 1/2013 | Butler | B60B 7/0013 |
| | | | 301/37.29 |
| 2014/0284994 A1 * | 9/2014 | Polka | B60B 7/04 |
| | | | 301/37.102 |

\* cited by examiner

WHEEL COVER ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to a wheel cover assembly for a vehicle to improve the aerodynamic properties of the wheel assembly.

Description of the Related Art

Highway vehicles, such as trucks, typically have wheel assemblies that have a recessed well in the center of the wheel assembly and the end of an axle protruding in the center of the well. The end of the axle may be covered with an end cap or other axle end member bolted onto the wheel assembly. As the vehicle moves, the recessed well of the wheel assembly causes air turbulence around the sides of the vehicle, decreasing fuel efficiency of the vehicle.

SUMMARY

Disclosed herein are embodiments of a wheel cover assembly for covering an interior portion of a wheel of a vehicle, the wheel cover assembly comprising an interface support constructed to be mounted onto a wheel assembly, a cover support constructed to be attached to the interface support, the cover support defining an outer perimeter and a center opening passing completely through the cover support, and a cover constructed to be attached to at least one of the interface support or the cover support, wherein the outer perimeter of the cover support is configured to align with a rim of the wheel well and the cover is configured to cover the center opening of the cover support when the wheel cover assembly is in an assembled position and allow access to the wheel well when in a disassembled position, and wherein the cover comprises at least one attachment mechanism to secure the cover to the interface support or the cover support.

In some embodiments, lug nuts connecting a wheel to an axle can be accessible when the cover is disassembled but are not accessible when the cover is assembled. In some embodiments, a tire air vent can be accessible when the cover is disassembled but is not accessible when the cover is assembled.

In some embodiments, the cover can comprise a main body, the attachment mechanism can comprise a spring element, a catch member, and a release handle, the spring element can be connected to the release handle and to the main body, and the spring element can bias the catch member to engage with the interface support or the cover support to secure the cover to the cover support and movement of the handle disengages the catch member.

In some embodiments, the wheel assembly can comprise a wheel mounted to an axle by a plurality of outer lug nuts having an outer lug bolt pattern with a first diameter and a plurality of inner lug nuts, the center opening of the cover support can have a second diameter that is greater than the first diameter, and the main body of the cover can have a third diameter that is greater than the second diameter and a center axis that is parallel to and aligned with an axle of the vehicle when the wheel cover assembly is installed on the wheel assembly.

In some embodiments, the spring element of the at least one attachment mechanism can have a first leg extending axially away from the main body and a second leg extending axially toward the main body, and wherein the second leg connects the first leg to the handle. In some embodiments, the spring element can comprise a catch that engages with a portion of the interface support or the cover support when the cover is coupled with the cover support. In some embodiments, the handle can be a release handle that is manually operable. In some embodiments, the cover can be configured to be decoupled from the cover support by manually moving the release handle toward the center axis.

In some embodiments, the at least one attachment mechanism can include a plurality of attachment mechanisms. In some embodiments, the plurality of attachment mechanisms can be arranged circumferentially equidistant from each other.

In some embodiments, the cover support can comprise at least one recess that is aligned with the handle when the cover is couple with the ring. In some embodiments, the interface support can comprise two or more mounting legs and a ring element. In some embodiments, the interface support can comprise two or more interface support components. In some embodiments, the interface support can be mounted on the wheel assembly with at least some of the inner and/or outer lug nuts.

In some embodiments, the cover support can be attachable to the interface support with fastening members. In some embodiments, the fastening members can attach to the ring via a plurality of fastening extensions.

In some embodiments, the cover support can comprise a drainage feature. In some embodiments, the interface support can comprise an access opening for a tire air valve. In some embodiments, the wheel cover assembly can comprise a locking mechanism.

Also disclosed herein are embodiments of a wheel assembly for a vehicle, the wheel assembly comprising a wheel attached to a wheel rim, the wheel rim defining a wheel cavity inside the wheel and wheel rim and a wheel cover assembly comprising an interface support mounted to the wheel rim and at least partially located within the wheel cavity, a cover support attached to the interface support, the cover support defining an outer perimeter and a center opening, and a cover releasably attached to at least one of the interface support or the cover support, wherein the outer perimeter of the cover support aligns with an internal edge of the wheel or wheel rim and the cover releasably covers the center opening of the cover support when the wheel cover is attached to at least one of the interface support or the cover support and allows access to the wheel cavity when the cover is removed from the at least one of the interface support or the cover support, and wherein the cover comprises at least one attachment mechanism to secure the cover to the interface support or the cover support.

Also disclosed herein are embodiments of a method for attaching a wheel cover assembly to removably cover an interior portion of a wheel of a vehicle, the method comprising attaching an interface support onto a wheel assembly, the wheel assembly defining an internal cavity formed by a wheel and wheel rim, attaching a cover support to the interface support, the cover support defining an outer perimeter and a center opening passing completely through the cover support, wherein the outer perimeter of the cover support is configured to align with an internal edge of the wheel, and attaching a cover to at least one of the interface support or the cover support, the cover comprising at least one attachment mechanism to secure the cover to the interface support or the cover support, wherein the cover is configured to be releasably attached to at least one of the interface support or the cover support, wherein the cover is configured to cover the center opening of the cover support when the cover is attached to at least one of the interface support or the cover support and allow access to the wheel well when the cover is removed from at least one of the interface support or the cover support.

The present disclosure relates to a wheel cover assembly for a wheel assembly of a vehicle. In one aspect, the wheel cover assembly improves the aerodynamics of the wheel assembly and can be installed with few tools and that allows for easy access to components of the wheel assembly (e.g. such as lug nuts used to mount the wheel assembly to the axle, tire air vents, and a hub odometer). In one embodiment, the wheel cover assembly comprises a bracket configured to be mounted onto the wheel assembly; an outer ring configured to be coupled with the bracket, the outer ring defining a center opening; and an inner cover removably couplable with the outer ring, wherein the inner cover comprises a main body and at least one attachment mechanism having a spring element, a catch and a handle, wherein the spring element connects the handle and the main body and wherein the spring element biases the catch to engage with the bracket or the outer ring to secure the inner cover to the outer ring.

The present disclosure further relates to a method for assembling a wheel cover assembly on a wheel assembly of a vehicle having a wheel mounted to an axle end member by a plurality of outer lug nuts and the axle end member mounted on an axle with a plurality of inner lug nuts comprising the steps of: mounting a bracket onto the wheel assembly with at least some of the inner lug nuts; coupling an outer ring with the bracket with fastening members, the outer ring defining a center opening; coupling an inner cover with the outer ring with an attachment mechanism having a spring element with a catch and a handle, wherein coupling the inner cover with the outer ring causes the catch to engage the bracket and the inner cover to substantially cover the center opening of the outer ring.

Disclosed herein are embodiments of a wheel cover assembly for covering a wheel well of a wheel assembly of a vehicle, the wheel cover assembly comprising a bracket constructed to be mounted onto the wheel assembly a ring constructed to be attached to the bracket, the ring defining an outer perimeter and a center opening, and a cover constructed to be attached to at least one of the bracket or the ring; wherein the outer perimeter of the ring aligns with a rim of the wheel well and the cover covers the center opening of the ring when the wheel cover assembly is in an assembled position, and wherein the cover comprises at least one attachment mechanism to secure the cover to the bracket or the ring.

In some embodiments, the cover can comprise a main body, the attachment mechanism comprises a spring element, a catch member, and a release handle, wherein the spring element is connected to the release handle and to the main body, and wherein the spring element biases the catch member to engage with the bracket or the ring to secure the cover to the ring and movement of the handle disengages the catch member. In some embodiments, the wheel assembly can comprise a wheel mounted to an axle by a plurality of outer lug nuts having a lug bolt pattern with a first diameter and a plurality of inner lug nuts, wherein the center opening of the ring has a second diameter that is greater than the first diameter, and wherein the main body of the cover has a third diameter that is greater than the second diameter and a center axis that is parallel to and aligned with an axle of the vehicle when the wheel cover assembly is installed on the wheel assembly.

In some embodiments, the spring element of the at least one attachment mechanism can have a first leg extending axially away from the main body and a second leg extending axially toward the main body, and wherein the second leg connects the first leg to the handle. In some embodiments, the spring element can comprise a catch that engages with a portion of the bracket or the ring when the cover is coupled with the ring. In some embodiments, the handle can be a release handle that is manually operable. In some embodiments, the cover can be decoupled from the ring by manually moving the release handle toward the center axis.

In some embodiments, the main body can have a front surface, and wherein the spring element has a depth extending axially from the main body and a width extending radially in the plane of the front surface, and wherein the depth is greater than the width.

In some embodiments, the at least one attachment mechanism can include a plurality of attachment mechanisms. In some embodiments, the attachment mechanisms can be arranged circumferentially equidistant from each other. In some embodiments, the attachment mechanisms can be arranged so that the cover is symmetrically balanced about its center axis. In some embodiments, the assembly can comprise three attachment mechanisms.

In some embodiments, the ring can comprise at least one recess that is aligned with the handle when the cover is couple with the ring. In some embodiments, the bracket can comprise two or more mounting legs and a ring element. In some embodiments, the bracket can comprise two or more bracket components. In some embodiments, the bracket components can form the ring element. In some embodiments, the bracket can be mounted on the wheel assembly with at least some of the inner lug nuts. In some embodiments, the ring can be attachable to the bracket with fastening members.

In some embodiments, the fastening members can comprise clips. In some embodiments, the fastening members can attach to the ring via a plurality of fastening extensions.

In some embodiments, the ring can comprise a drainage feature. In some embodiments, the drainage feature can comprise cut-outs at an outer perimeter of the ring.

In some embodiments, the bracket can comprise an access opening for a tire air valve. In some embodiments, the wheel cover assembly can provide an aerodynamic surface, such as a sloped or curved surface that allows air to flow away from the wheel, for the wheel assembly. In some embodiments, the wheel cover assembly can comprise a locking mechanism.

Also disclosed herein are embodiments of a wheel assembly for a vehicle comprising a wheel mounted to an axle by a plurality of outer lug nuts having a lug bolt pattern with a first diameter and by a plurality of inner lug nuts, and a wheel cover assembly, wherein the wheel cover assembly comprises a bracket constructed to be mounted onto the wheel assembly, a ring constructed to be coupled with the bracket, the ring defining a center opening, and a cover constructed to be attached to at least one of the bracket or the ring, wherein the cover comprises a main body and at least one attachment mechanism having a spring element, a catch member, and a release handle, wherein the spring element is connected to the release handle and to the main body, and wherein the spring element biases the catch member to engage with the bracket or the ring to secure the cover to the ring and movement of the handle disengages the catch member.

Also disclosed herein are embodiments of a vehicle comprising a wheel assembly and a wheel cover assembly, wherein the wheel assembly comprises a wheel mounted to an axle by a plurality of outer lug nuts having a lug bolt pattern with a first diameter and by a plurality of inner lug nuts, and wherein the a wheel cover assembly comprises a bracket constructed to be mounted onto the wheel assembly, an ring constructed to be coupled with the bracket, the ring defining a center opening, and a cover constructed to be attached to at least one of the bracket or the ring, wherein the cover comprises a main body and at least one attachment mechanism having a spring element, a catch member, and a release handle, wherein the spring element is connected to the release handle and to the main body, and wherein the spring element biases the catch member to engage with the bracket or the ring to secure the cover to the ring and movement of the handle disengages the catch member.

Also disclosed herein are embodiments of a method for assembling a wheel cover assembly on a wheel assembly of a vehicle having a wheel mounted to an axle by a plurality of outer lug nuts and by a plurality of inner lug nuts comprising the steps of mounting a bracket onto the wheel assembly with at least some of the inner lug nuts, coupling an ring with the bracket with fastening members, the ring defining a center opening, coupling an cover with the ring with an attachment mechanism having a spring element with a catch and a handle, wherein coupling the cover with the ring causes the catch to engage the bracket or the ring and the cover to substantially cover the center opening of the ring.

In some embodiments, the method can further comprise uncoupling the cover from the assembled wheel cover assembly by manually moving the handle toward a center axis of the cover. In some embodiments, uncoupling the cover from the assembled wheel cover assembly allows for access to components of the wheel and axle. In some embodiments, uncoupling the cover from the assembled wheel cover assembly can allow for access to a hub odometer. In some embodiments, uncoupling the cover from the assembled wheel cover assembly can allow for access to lug nuts of the wheel. In some embodiments, uncoupling the cover from the assembled wheel cover assembly can allow for access to a tire air valve.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
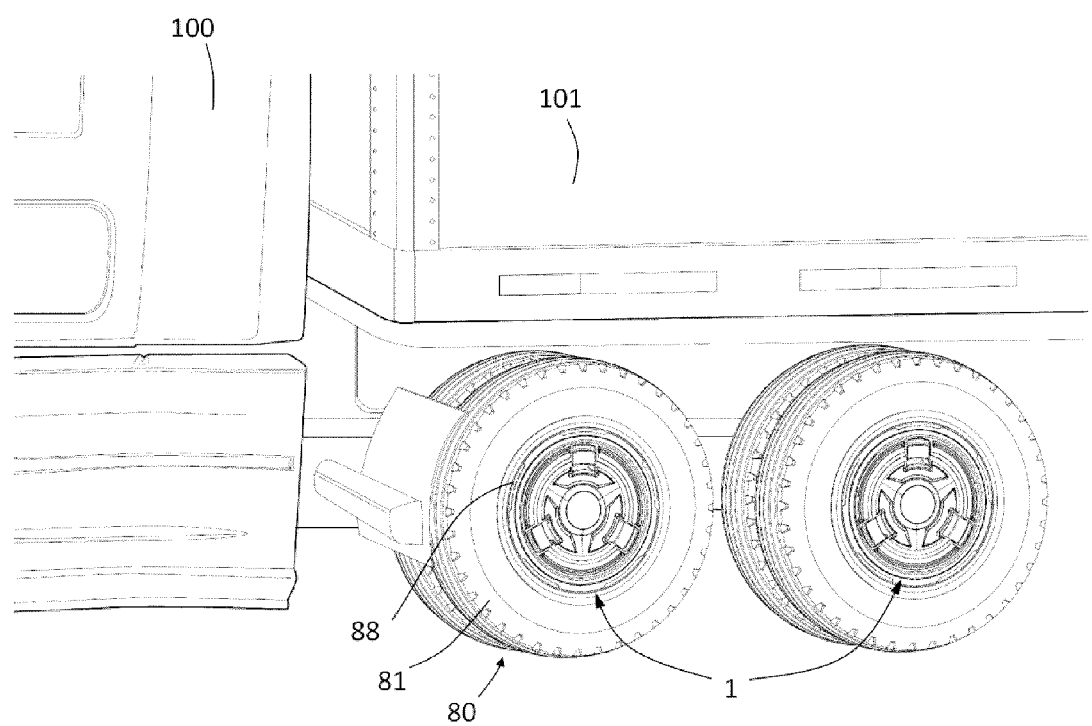
FIG. 1 shows an embodiment of the wheel cover assembly as assembled on a wheel assembly of a vehicle.

The present disclosure relates to a wheel cover assembly for a wheel assembly of a vehicle. In particular, the present disclosure relates to a wheel cover assembly for high way vehicles, such as trucks, semi-trucks, and the like, though the type of vehicle does not limit the disclosure. The wheel cover assembly of the present disclosure can be used, for example, to improve the aerodynamic profile of a wheel assembly having a wheel well, particularly a deep wheel well that causes air turbulence in and around the wheel well and, therefore, poor fuel economy. As will be recognized by one skilled in the art, and as evidence by the below disclosure, the wheel well can be the interior portion surrounded by a wheel and wheel rim, which can be shown as wheel well 85 with respect to FIG. 10C. For example, the wheel well can be an internal cavity defined by the wheel. Advantageously, use of embodiments of the disclosed wheel cover assembly can increase fuel economy, thus providing economic savings.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 shows an embodiment of the wheel cover assembly 1 assembled on a wheel assembly 80 of a vehicle, e.g., semi-truck, having a truck 100 and a trailer 101. In some embodiments, the wheel cover assembly 1 can be installed and assembled on the wheel assembly 80 with minimal tools, e.g., a wrench. The wheel cover assembly 1 can further allow manual or tool free-access to components of the wheel assembly 80, such as lug nuts of the wheel, a hubodometer, and a tire air vent. Accordingly, the while cover assembly 1 can easily allow access to the inner components of the wheel assembly 80 with minimal effort to the user.

The wheel assembly 80 of a vehicle can be mounted on an axle by a plurality of lug nuts, e.g., the outer lug nuts 83 and the inner lug nuts 84 (see FIG. 9A), both sets of lug nuts having a lug bolt pattern. The end of the axle may be covered with an axle end member, e.g., a hub 82, that can be connected to the wheel with the outer lug nuts 83 and to the axle with the inner lug nuts 84. The hub 82 may be positioned inside a wheel well 85 located at the center of the wheel assembly 80 and inside the tire 81 of the wheel assembly 80. Various components, such as an odometer (e.g., the hubodometer) and a tire air vent, among other components, may also be located within the wheel well 85.

Deep wheel wells of high way vehicles, such as trucks and semi-trucks, are known to cause turbulence in and around the wheel well. Turbulence in and around the wheel well can increase fuel consumption of the vehicle, increasing costs for transporting goods. It can therefore be advantageous to provide for a more aerodynamic surface for the wheel assembly of the vehicle, thus reducing turbulence and improving the fuel economy of the vehicle. According to the present disclosure, a more aerodynamic surface can be provided by incorporating embodiments of a wheel cover assembly for the wheel assembly of the vehicle.

Figure 2A:
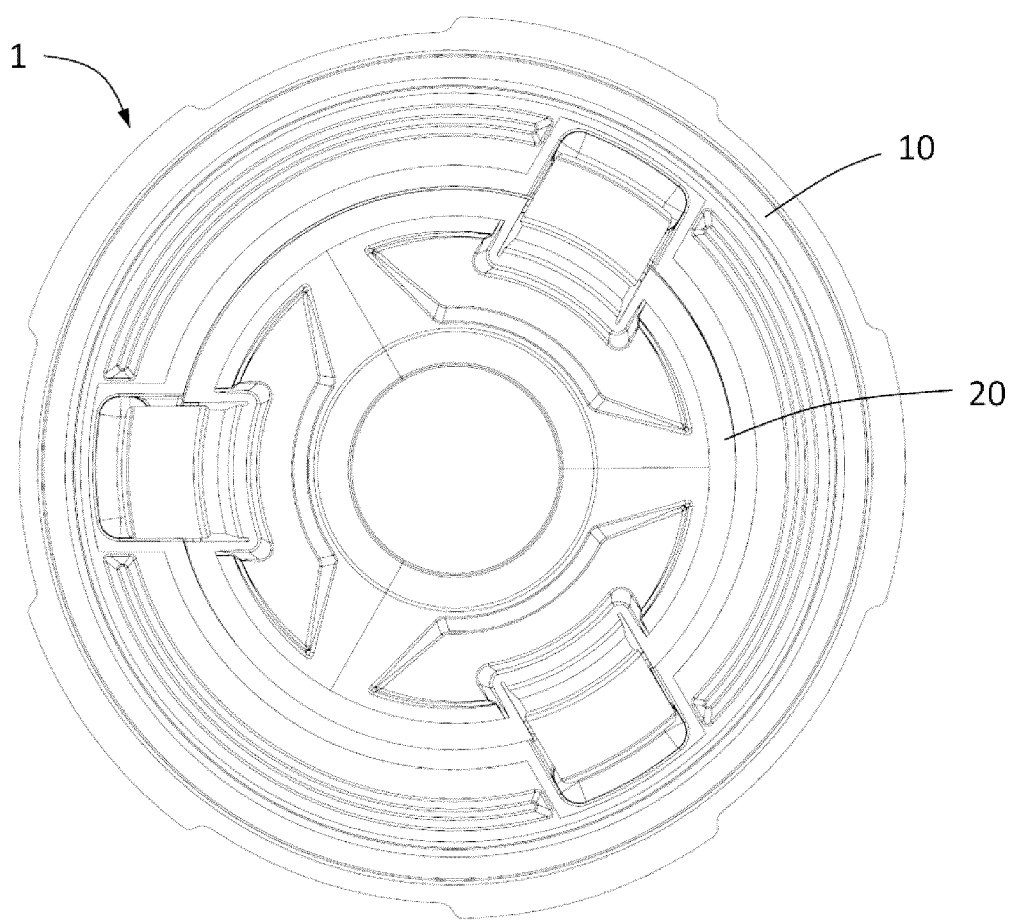
FIG. 2A shows a front view of an embodiment of the wheel cover assembly of FIG. 1.
Figure 2B:
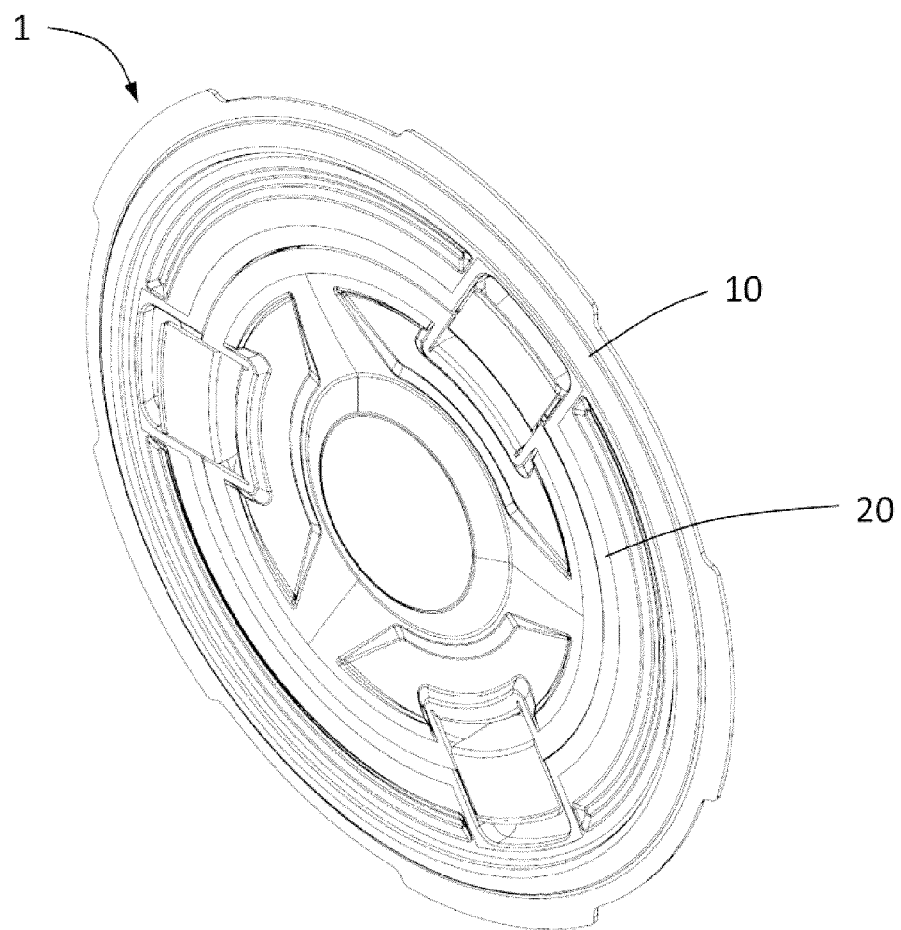
FIG. 2B shows an angled front view of an embodiment of the wheel cover assembly of FIG. 1.
Figure 2C:
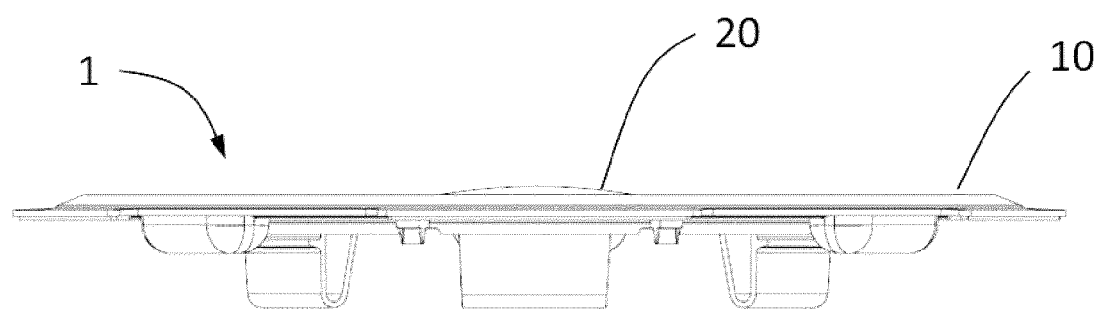
FIG. 2C shows a side view of an embodiment of the wheel cover assembly of FIG. 1.

FIGS. 2A-2C show an embodiment of the cover support, such as an outer ring 10, though other shapes can be used as well and the shape of the outer ring 10 does not limit the disclosure, and the inner cover 20 of the wheel cover assembly 1. When the wheel cover assembly 1 is in an assembled position, the inner cover 20 can be removably coupled to the outer ring 10 by an attachment mechanism, forming an outer surface that can cover a wheel well 85 of the wheel assembly 80 of the vehicle. While the wheel cover assembly 1 is in an assembled position, assembled on a wheel assembly 80, the outer surface of the wheel cover assembly 1 may provide the wheel assembly 80 with improved aerodynamics. The outer ring 10 can fit tightly against the wheel assembly 80 to prevent air and/or debris from entering the wheel assembly 80. The inner cover 20 can be removed from the outer ring 10 by the use of one or more handles 25 (e.g., release handles), grips, protrusions, or other surfaces, and the removal mechanism does not limit the disclosure. Removing the inner cover 20 from the outer ring 10 allows for ease of access to components of the wheel assembly 80, such as lug nuts of the wheel, a hubodometer, and a tire air vent, among other components.

FIGS. 3A-3G show embodiments of the outer ring 10. The outer ring 10 can comprise a center opening 11 that allows for access to components of the wheel assembly 80 without requiring removal of the outer ring 10. The center opening 11 can generally circular, ovaloid, square, or other shape, and the shape of the center opening 11 does not limit the disclosure. The outer ring 10 has an outer diameter D10 and a radius r1. The center opening 11 has a diameter D11, less than diameter D10. According to some embodiments, the diameter D11 of the center opening 11 can be at least about as large as diameter D83 of the lug bolt pattern of the outer lug nuts 83. According to some embodiments, the diameter D11 of the center opening 11 can be less than the diameter D83 of the lug bolt pattern of the outer lug nuts 83.

The outer ring 10 can comprise at least one drainage feature 13 that allows for water and/or dirt and debris to drain out of the wheel well 85 of the wheel assembly 80. The drainage feature 13 may comprise, for example, a plurality of cut-outs, holes, or apertures around the perimeter of the outer ring 10. An embodiment of the drainage feature 13 (e.g., a cut-out) is shown in FIGS. 3A, 3B 3F, and 3G. According to an embodiment shown in FIG. 3A, the drainage feature 13 is a cut-out with a depth L1, and the radius of the outer ring at the location of the cut-out is r2.

The outer ring 10 may also comprise one or more recesses 12. In some embodiments, the outer ring 10 can comprise a plurality of recesses, such as three recesses 12 shown in FIG. 3A, though the amount of recesses does not limit the disclosure. When the wheel cover assembly 1 is in an assembled position, the recesses 12 can facilitate gripping the handle 25 of the inner cover 20, discussed below. In some embodiments, the outer ring 10 can have the same number of recesses 12 as there are handles 25 of the inner cover 20. In some embodiments, the outer ring 10 can have fewer recesses 12 as there are handles 25 of the inner cover 20. In some embodiments, the outer ring 10 can have more recesses 12 as there are handles 25 of the inner cover 20. In some embodiments, the recess 12 can be sized to comfortably fit one or more fingers of a user. In some embodiments, the recess 12 can be sized to be large enough to allow for convenient removal of accumulated debris, e.g., dirt, snow, or ice from the recess 12. In some embodiments, the recess 12 can be removably covered. In some embodiments, the recess 12 can have a length L12 that is about 1, 2, 3, 4, or 5 inches, a width W12 that is about 1, 1.1, 1.2, 1.3, 1.4, or 1.5 inches, and a depth D12 that is about 0.5, 0.6, 0.7, 0.8, 0.9, or 1.0 inches. In some embodiments, the recess 12 can have a length L12 that is less than about 1, 2, 3, 4, or 5 inches, a width W12 that is less than about 1, 1.1, 1.2, 1.3, 1.4, or 1.5 inches, and a depth D12 that is less than about 0.5, 0.6, 0.7, 0.8, 0.9, or 1.0 inches. In some embodiments, the recess 12 can have a length L12 that is greater than about 1, 2, 3, 4, or 5 inches, a width W12 that is greater than about 1, 1.1, 1.2, 1.3, 1.4, or 1.5 inches, and a depth D12 that is greater than about 0.5, 0.6, 0.7, 0.8, 0.9, or 1.0 inches.

According to some embodiments, the outer ring 10 may include elements that can contribute to an aerodynamic profile of the wheel cover assembly 1. For example, the outer ring 10 may comprise a sloped profile shown as a deflector lip 15 in FIGS. 3D and 3E. The deflector lip 15 may be configured to help redirect air around the wheel cover assembly 1 when the wheel cover assembly 1 is in an assembled position.

According to some embodiments, the outer ring 10 can be connectable to an interface support, such as bracket 30, discussed in detail below, by a plurality of fastening members 41. The fastening members 41 in turn can connect to corresponding fastening extensions 14 of the outer ring 10. In an embodiment shown in FIG. 3F, a plurality of fastening extensions 14 can be located on the back side of the outer ring 10, i.e., the side facing the wheel assembly 80 when the wheel cover assembly 1 is in an assembled position. The outer ring 10 may comprise any number of fastening extensions 14 that is sufficient to securely fasten the outer ring 10 to the bracket 30, and the number and position of the fastening extensions 14 does not limit the disclosure. For example, the outer ring 10 may comprise between 3-12 fastening extensions 14. In some embodiments, the outer ring 10 comprises eight (8) fastening extensions 14. The type of fastening extension 14 does not limit the disclosure, and any type of fastening extension (e.g., frictional, locking, spring) can be used.

Figure 3A:
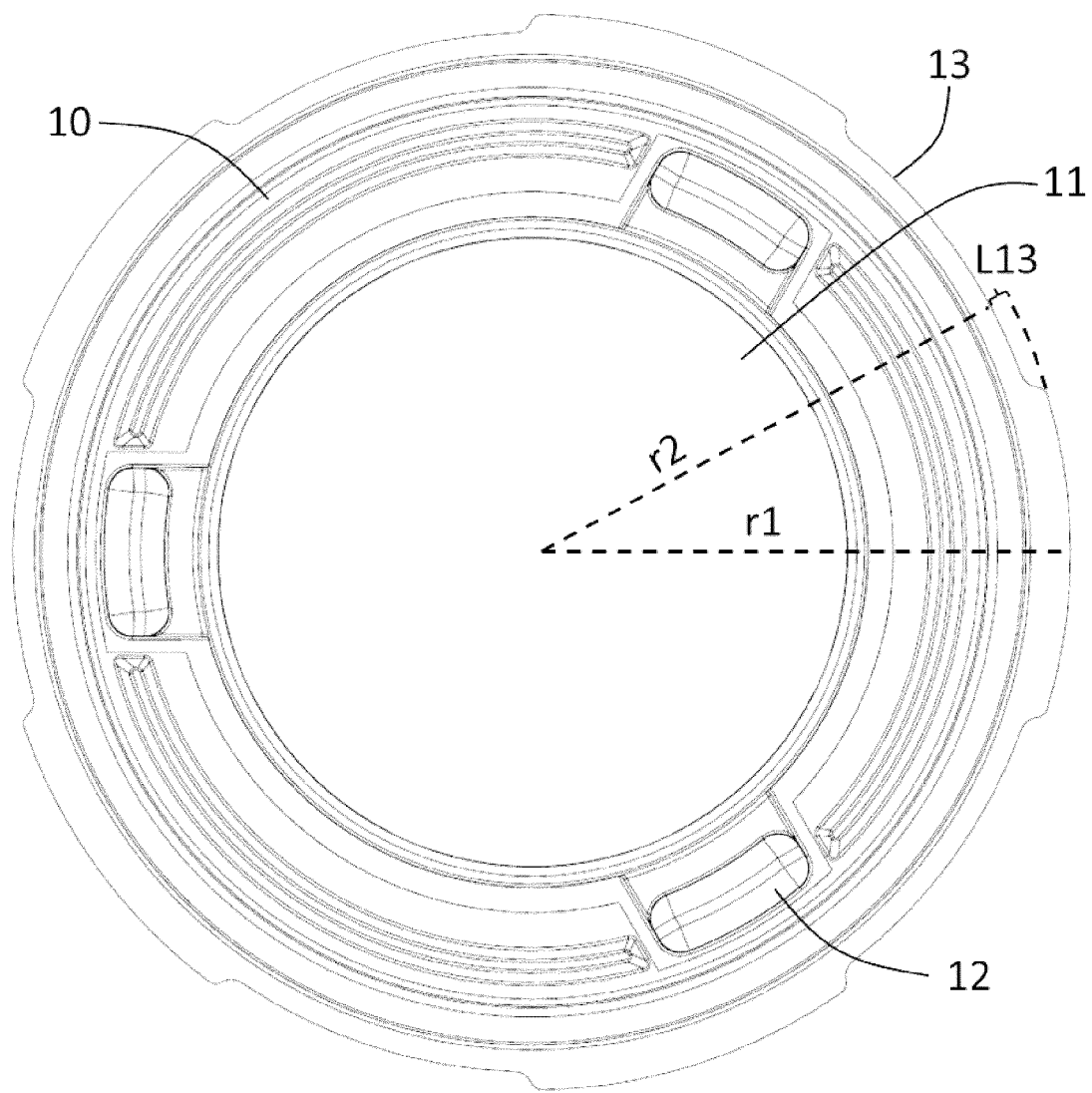
FIG. 3A shows an embodiment of an outer ring of the wheel cover assembly of FIG. 1.
Figure 3B:
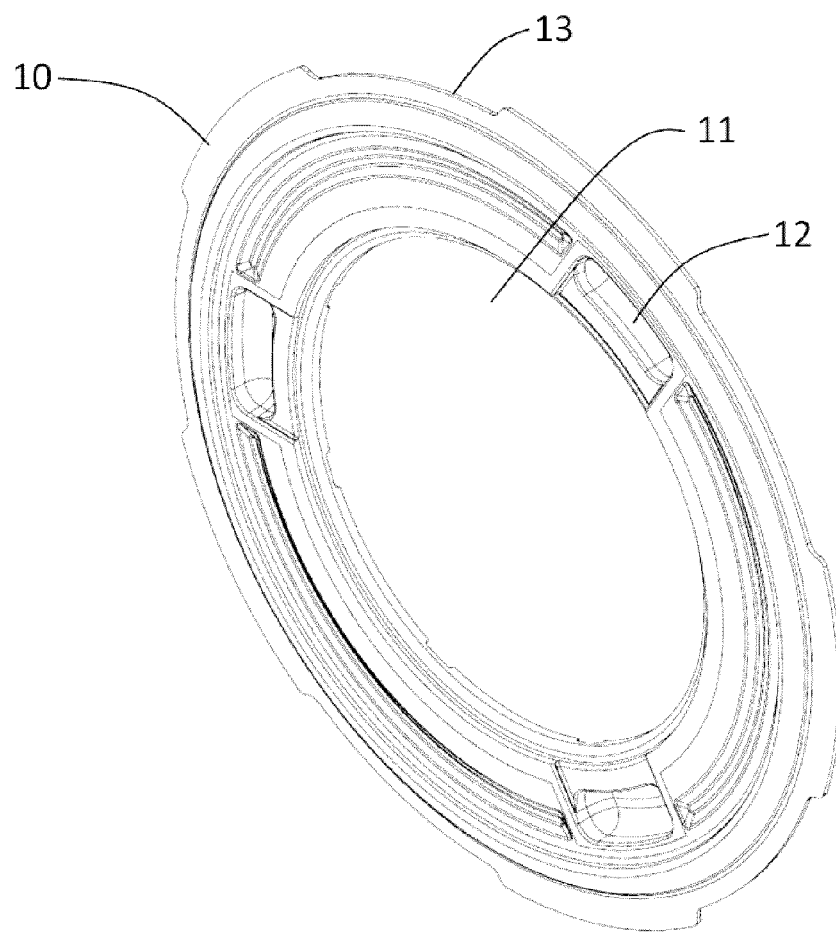
FIG. 3B shows an embodiment of the outer ring of the wheel cover assembly of FIG. 3A.
Figure 3C:
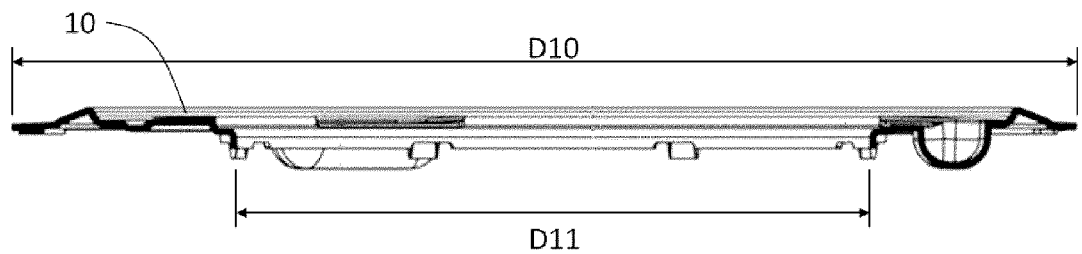
FIG. 3C shows a cross sectional view of the outer ring of the wheel cover assembly of FIG. 3A.
Figure 3D:
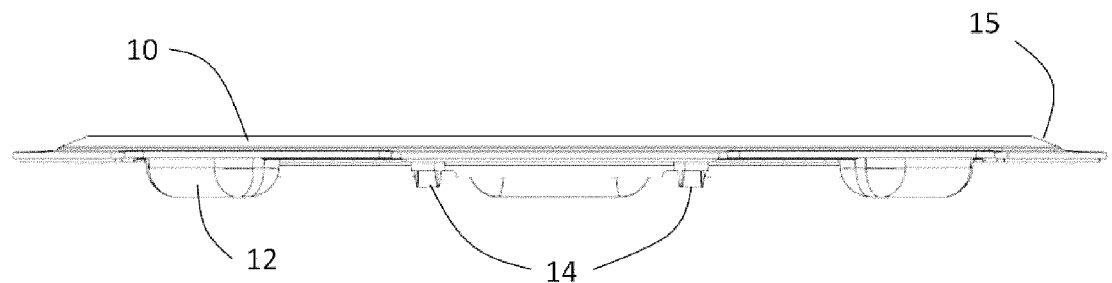
FIG. 3D shows a side view of the outer ring of the wheel cover assembly of FIG. 3A.
Figure 3E:
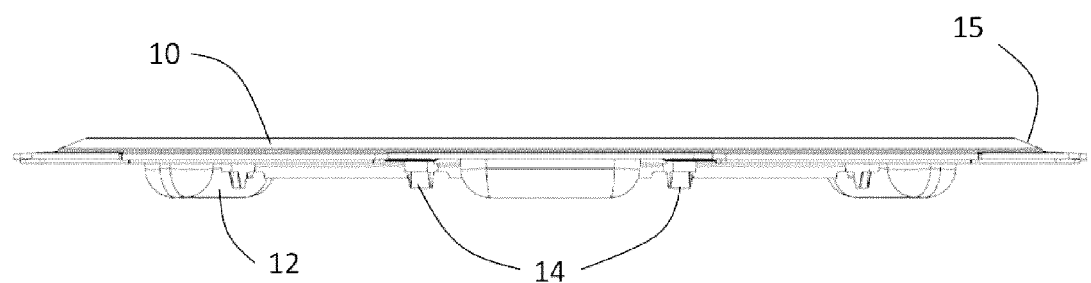
FIG. 3E shows a side view of the outer ring of the wheel cover assembly of FIG. 3A.
Figure 3F:
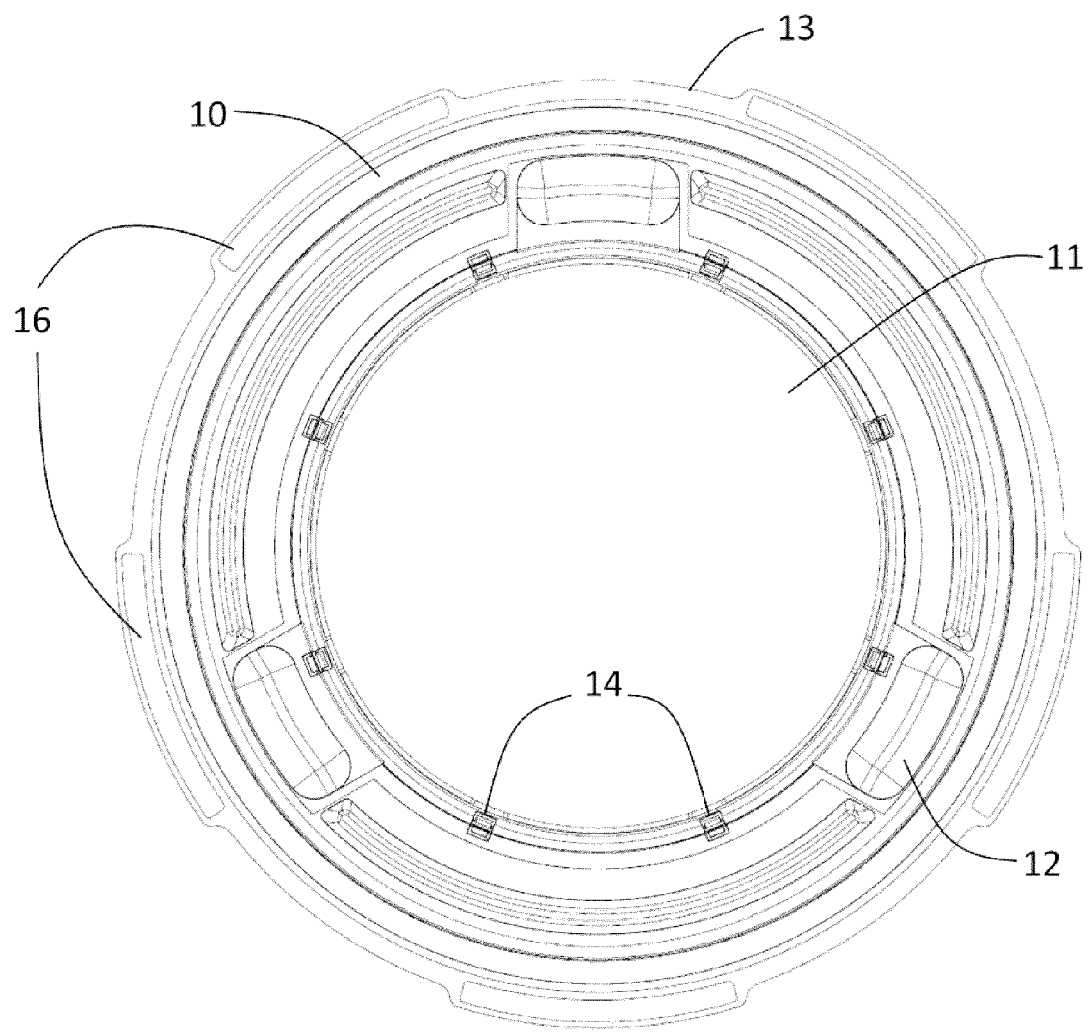
FIG. 3F shows a back view of the outer ring of the wheel cover assembly of FIG. 3A.
Figure 3G:
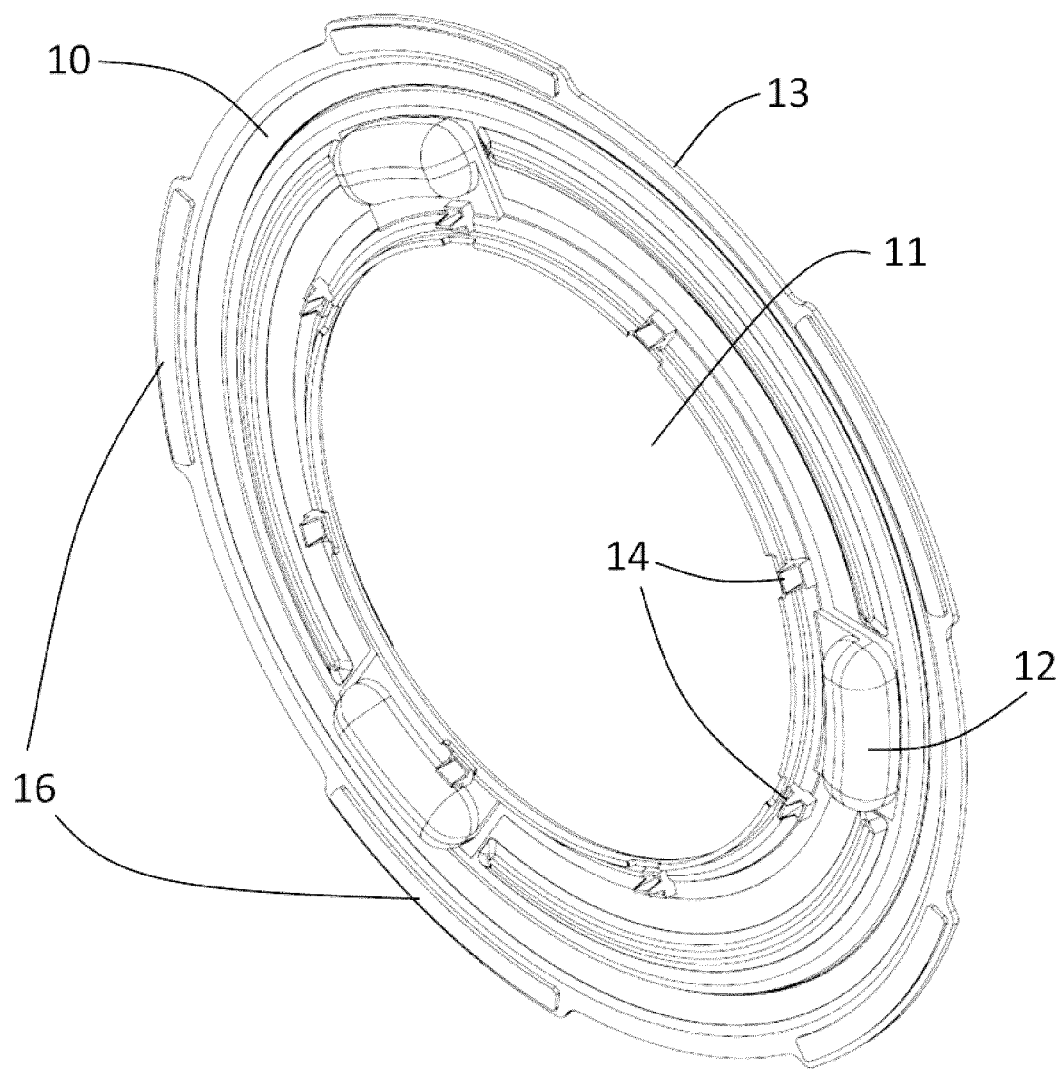
FIG. 3G shows an angled back view of the outer ring of the wheel cover assembly of FIG. 3A.

In some embodiments, the outer ring 10 can comprise one or more protective pads 16. As shown in FIGS. 3F and 3G, the protective pads 16 can be located on the underside of the outer ring 10. The protective pads 16 can be placed along the perimeter of the outer ring 10 so that when the wheel cover assembly 1 is installed on the wheel assembly 80 (see FIGS. 9A-10C), the protective pads 16 engage the wheel assembly 80, for example by engaging a rim 88 of the wheel well 85. The protective pads 16 can protect the wheel assembly 80 from excessive wear by the wheel cover assembly 1. The protective pads 16 can be manufactured from any suitable material, and the type of material does not limit the disclosure. In some embodiments, the protective pads 16 can comprise rubber, foam, or other elastomeric material.

FIGS. 4A-4E show embodiments of the inner cover 20. As shown, the inner cover 20 can be generally circular, but the shape of the inner cover does not limit the disclosure any other shape can be used as well such as an oval, rectangle, or triangle. The inner cover 20 comprises a main body 21, and at least one attachment mechanism 22 that facilitates the removable coupling of the inner cover 20 to the outer ring 10. The inner cover 20 has diameter D20 that may be at least about as large as the diameter D11 of the center opening 11 of the outer ring 10 and can be sized and configured to fit over the center opening.

According to some embodiments, the attachment mechanism 22 can comprise a spring element 23 connected to a handle 25. The attachment mechanism 22 may be an integral part of the main body 21 of the inner cover 20 or may be a separate piece. The attachment mechanism 22 may also comprise a catch 24, shown in FIG. 4C, that operably connects to the bracket 30 or the outer ring 10 to hold the inner cover 20 in place when the wheel cover assembly 1 is in an assembled position. The attachment mechanism 22 may contain one catch 24 or a plurality of catches 24. According to some embodiments, the spring element 23 of the attachment mechanism 22 can bias the catch 24 to engage with a ring element 31 of the bracket 30 or with the outer ring 10 to couple and secure the inner cover 20 to the outer ring 10. For example, the spring element 23 may bias the catch 24 to engage with the inner edge of the ring element 31 of the bracket or the rim of the center opening 11 of the outer ring 10.

Figure 4A:
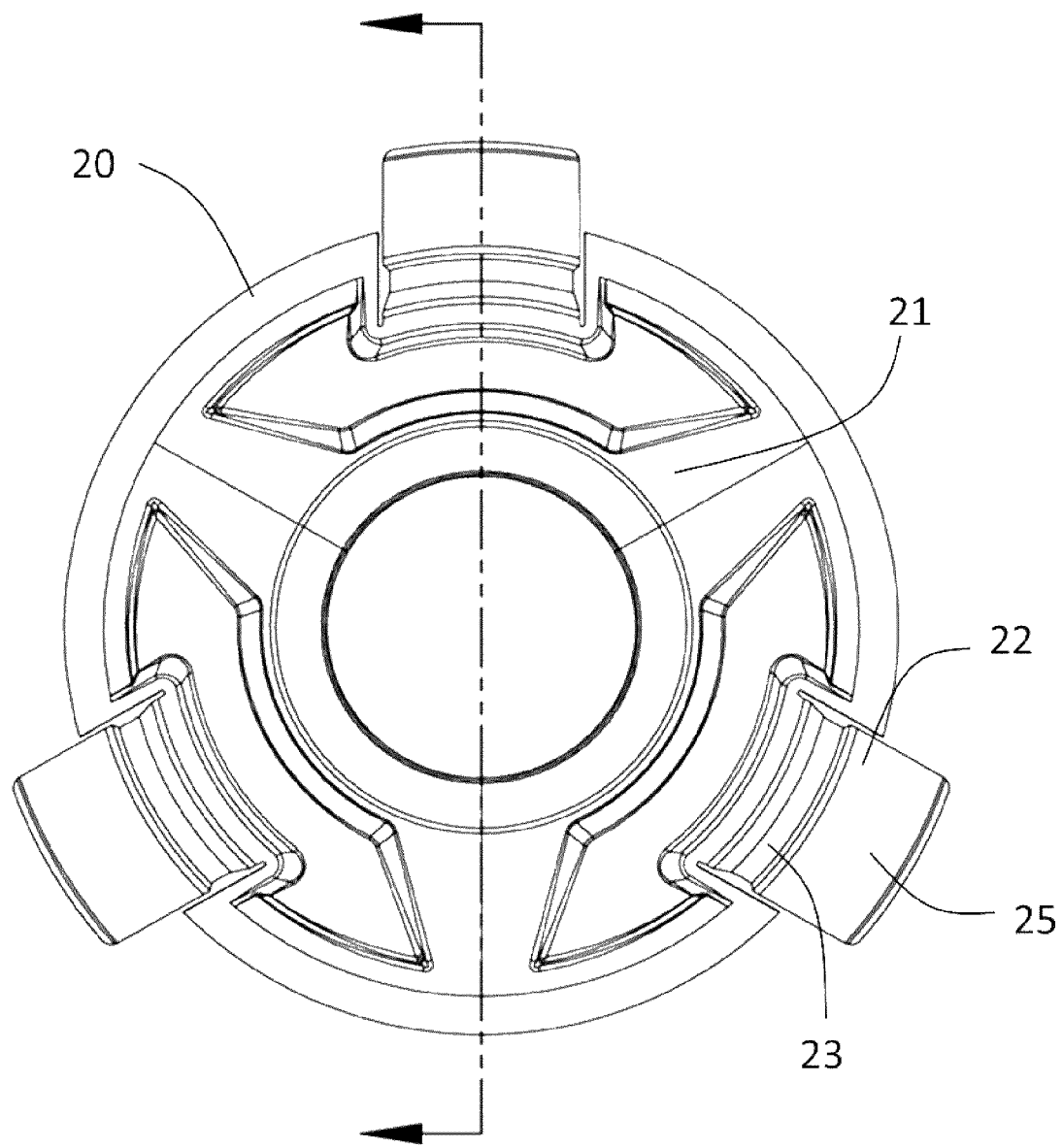
FIG. 4A shows an embodiment of an inner cover of the wheel cover assembly of FIG. 1.
Figure 4B:
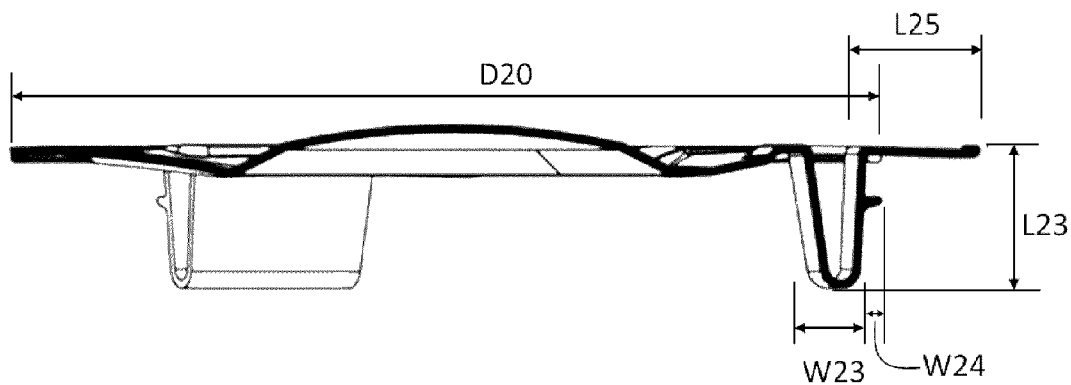
FIG. 4B shows a cross sectional view of the inner cover of FIG. 4A.
Figure 4C:
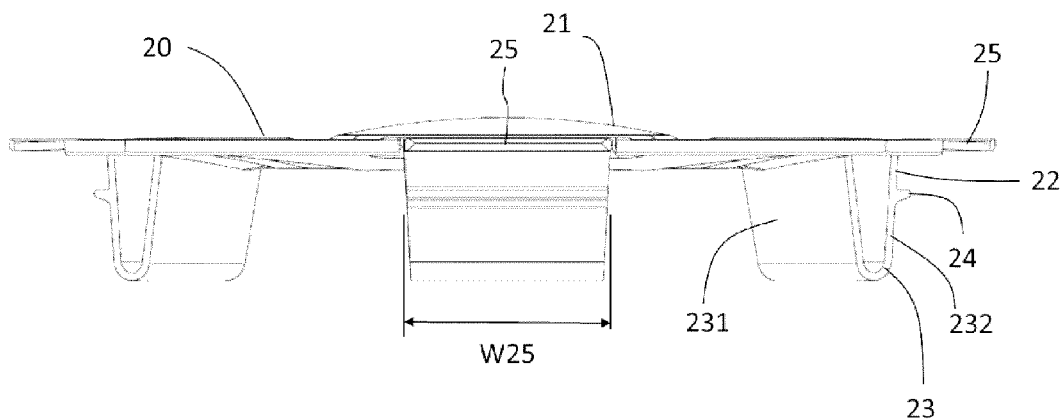
FIG. 4C shows a side view of the inner cover of FIG. 4A.
Figure 4D:
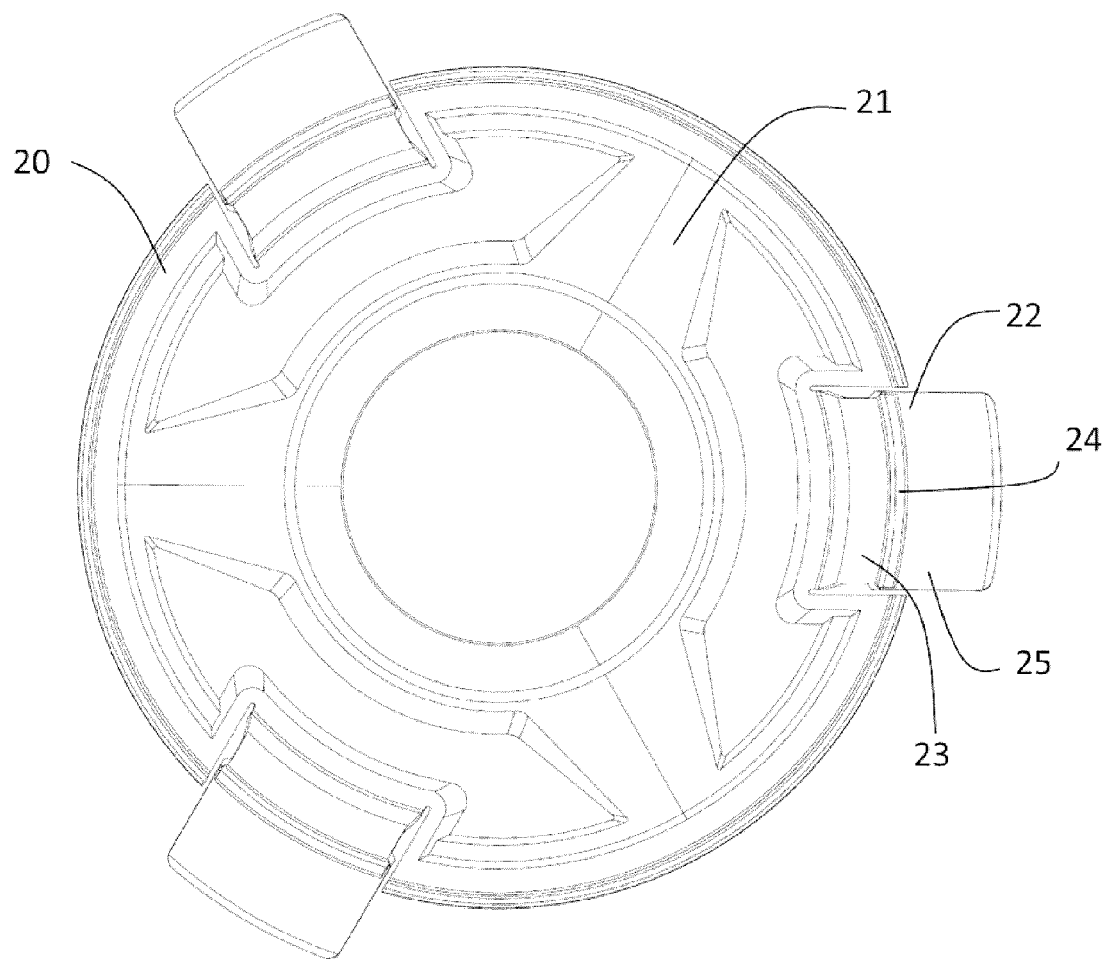
FIG. 4D shows a back view of the inner cover of FIG. 4A.
Figure 4E:
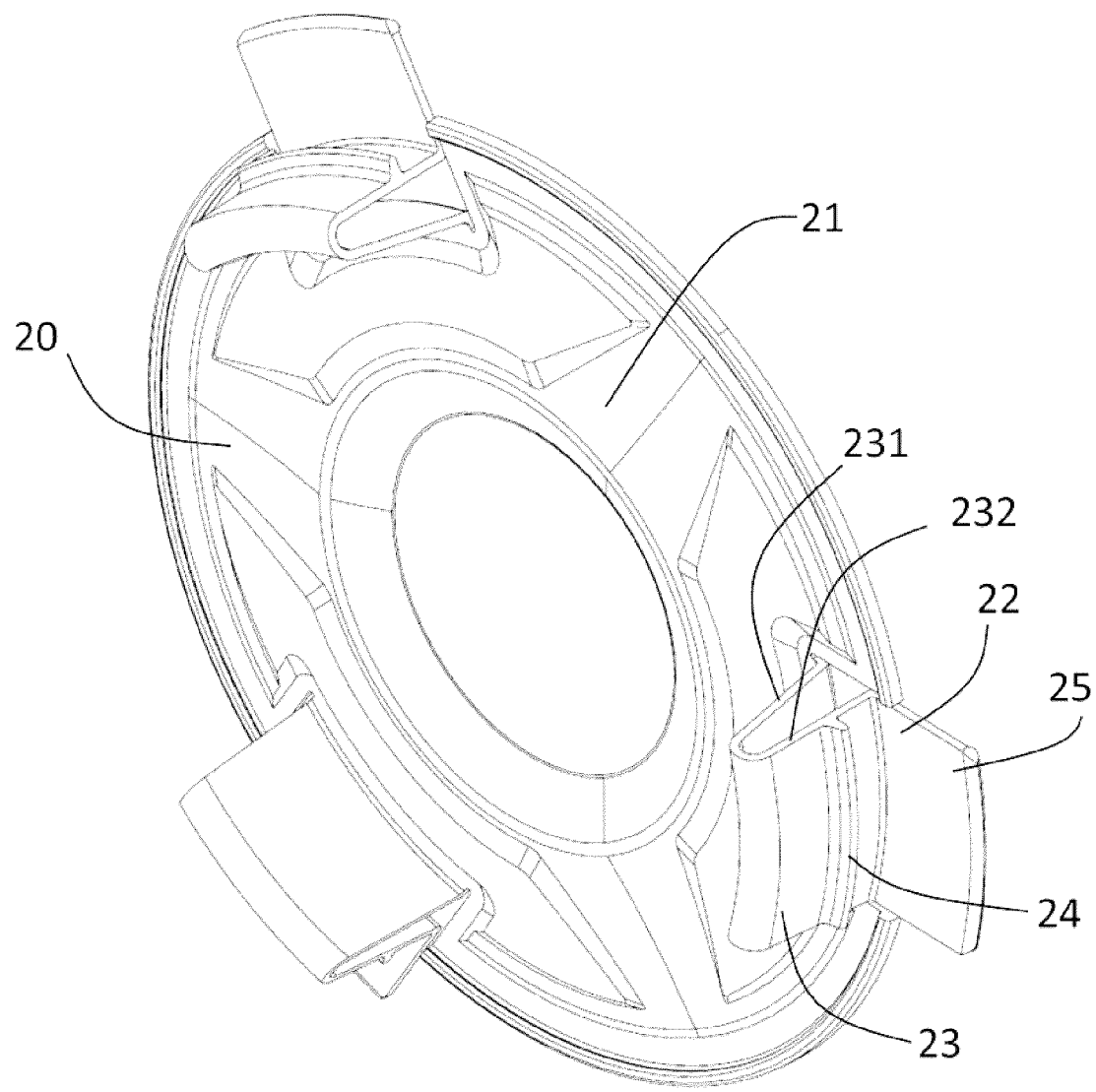
FIG. 4E shows an angled back view of the inner cover of FIG. 4A.

As shown in FIG. 4C, in some embodiments, the spring element 23 can have a first leg 231 that extends axially away from the main body 21 approximately in the direction of the axle of the vehicle, and a second leg 232 connected to the first leg 231 extending toward the main body 21. In some embodiments, the first leg 231 can extend behind the main body 21 (i.e., toward the vehicle when the wheel cover assembly 1 is in an assembled position). The second leg 232 may comprise the catch 24 such that the catch 24 extends radially from the second leg 232 toward the outer edge of the main body 21.

The inner cover 20 may be decoupled from the outer ring 10 by manual operation of the attachment mechanism 22. For example, the attachment mechanism 22 can be operated by application of a force generally towards the center of the inner cover 20 to release the catch 24 from engagement with the ring element 31 of the bracket 30 or the outer ring 10. In some embodiments, a user can decouple the inner cover 20 from the bracket 30 or outer ring 10 by hand. In some embodiments, an automated system can be used to decouple the inner cover 20 from bracket 30 or the outer ring 10.

As shown in FIGS. 4B and 4C, the spring element 23 has a depth L23 and width W23; the catch 24 has a depth L24 and width W24; and the handle 25 has a depth L25 and width W25. In some embodiments, the width W25 of the handle 25 can be approximately the same or slightly less than the width W12 of the recess 12 of the outer ring 10. The width W24 of the catch 24 may be approximately the same or less than the width W25 of the handle 25.

In the embodiments, the width W23 and depth L23 of the spring element 23 can be configured, considering the material properties of the spring element 23, to produce a suitable spring force. For example, the width W23 of the spring element 23 may be greater than the depth L24 of the catch 24, and the depth L23 of the spring element 23 may be greater than the width W23. In some embodiments, the ratio of the depth L23 of the spring element 23 to the width W23 is about 2:1, 3:1, 4:1, or 5:1. In some embodiments, the ratio of the depth L23 of the spring element 23 to the width W23 is greater than about 2:1, 3:1, 4:1, or 5:1. In some embodiments, the ratio of the depth L23 of the spring element 23 to the width W23 is less than about 2:1, 3:1, 4:1, or 5:1. A suitable spring force can be such that it is capable of biasing the catch 24 to engage with the ring element 31 of the bracket 30 or the outer ring 10, providing sufficient resistance to hold the inner cover 20 in its assembled position, and allowing for manual, preferably tool-free, decoupling of the inner cover 20 from the outer ring 10 when desired. According to some embodiments, to decouple the inner cover 20 from the outer ring 10, the handle 25 can be moved toward the center of the main body 21 by a distance that is equal to or greater than the depth L24 of the catch 24 and that is sufficient to release the catch 24 from engagement with the ring element 31 of the bracket 30 or the outer ring 10.

According to some embodiments, the inner cover 20 can comprise a plurality of attachment mechanisms 22. For example, the inner cover 20 may comprise 2, 3, 4, 5, or 6 attachment mechanisms 22, or in some embodiments, three (3) attachment mechanisms 22. However, the number of attachment mechanisms 22 does not limit the disclosure. The attachment mechanisms 22 may be arranged so that the inner cover 20 is symmetrically balanced about its center point or axis. In some embodiments, the attachment mechanisms 22 can be arranged circumferentially equidistant around the perimeter of the main body 21, though the arrangement does not limit the disclosure.

FIGS. 5A-5H show embodiments of a bracket 30. The bracket 30 can be mounted on the wheel assembly 80 of the vehicle to facilitate coupling of the wheel cover assembly 1 with the wheel assembly 80. According to some embodiments, the bracket 30 can comprise a ring element 31 and legs 32 connected to the ring element 31, the ring element 31 having a diameter D31. In some embodiments, the bracket 30 can be ring shaped, oval shaped, rectangular shaped, or triangular shaped, and the shape of the bracket 30 does not limit the disclosure. In some embodiments, the bracket 30 can comprise two or more bracket components 34 that together form the ring element 31. In some embodiments, each bracket component 34 can have one or more legs 32 connecting the ring element 31 to one or more feet 33. In some embodiments, some of the bracket components 34 can have at least one leg 32 while others may not. The bracket components 34 may be permanently or removably coupled together by bracket component connectors 35, e.g., rivets, to form the bracket 30, and the coupling mechanism does not limit the disclosure. In some embodiments, the bracket components 34 may have some rotatability upon connection to one another. The bracket 30 may also be comprised of more than two bracket components or a single bracket component comprising the ring element 31 and at least one leg 32.

According to some embodiments, the bracket 30 can comprise one or more mounting holes 38 that are located at the foot 33 of the bracket 30. According to some embodiments, the bracket comprises a plurality of mounting holes 38 (e.g., four mounting holes 38) that are spaced apart such that the bracket can be mounted on the wheel assembly 80 using at least some of the inner lug nuts 84 or at least some of the outer lug nuts 83. For example, the mounting holes 38 may have a mounting hole pattern with a diameter D38 that is substantially equal to the diameter D84 of the lug nut pattern of the inner lug nuts 84. Alternatively, the diameter D38 of the mounting hole pattern may be substantially equal to the diameter D83 of the outer lug nut pattern for mounting the bracket using the outer lug nuts 83. Accordingly, either the outer or inner lug nuts 83/84 can be used to attach the bracket 30 to the wheel assembly 80, and no further attachment pieces may be needed.

Figure 5A:
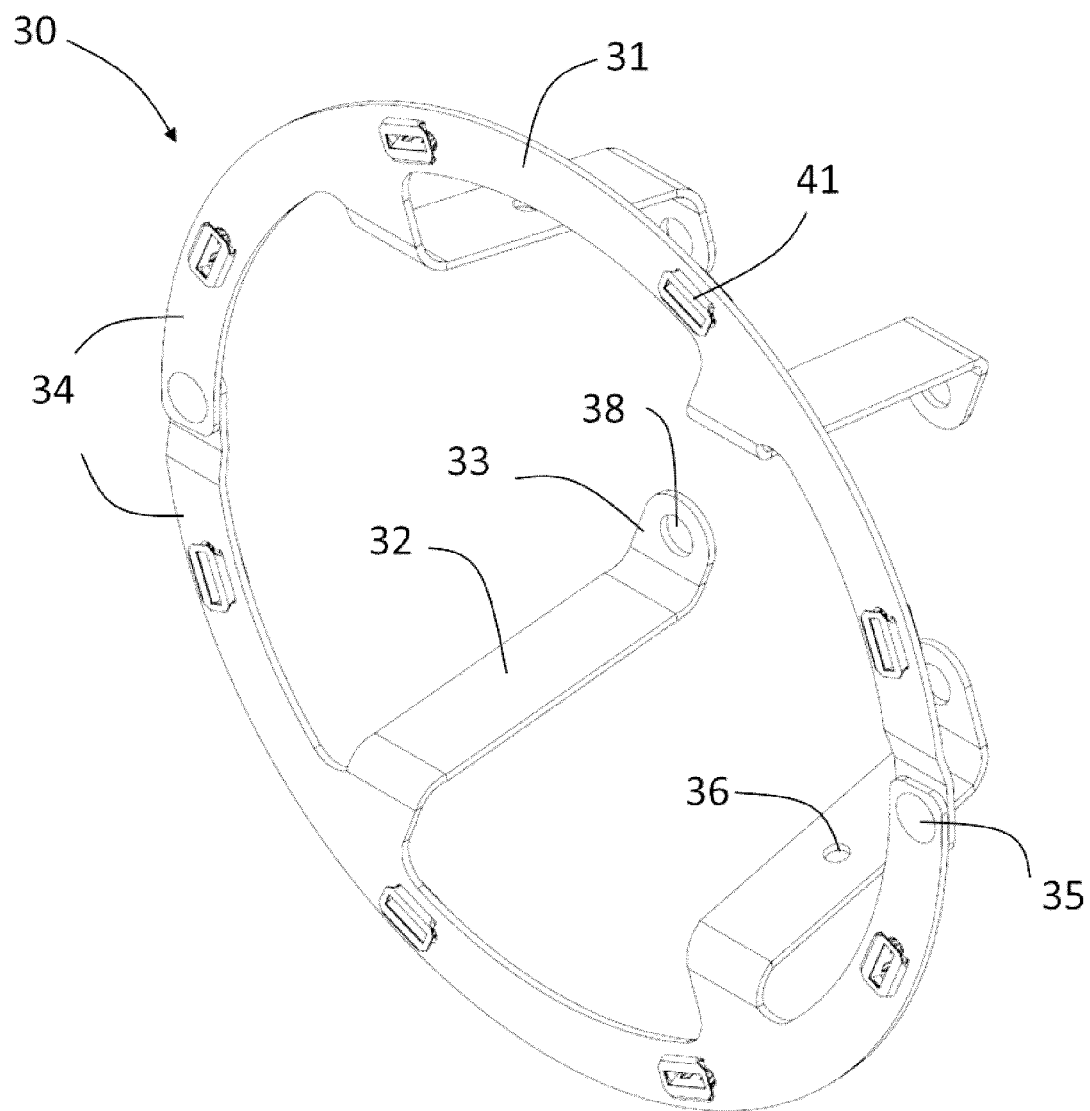
FIG. 5A shows an embodiment of a bracket of the wheel cover assembly of FIG. 1.
Figure 5B:
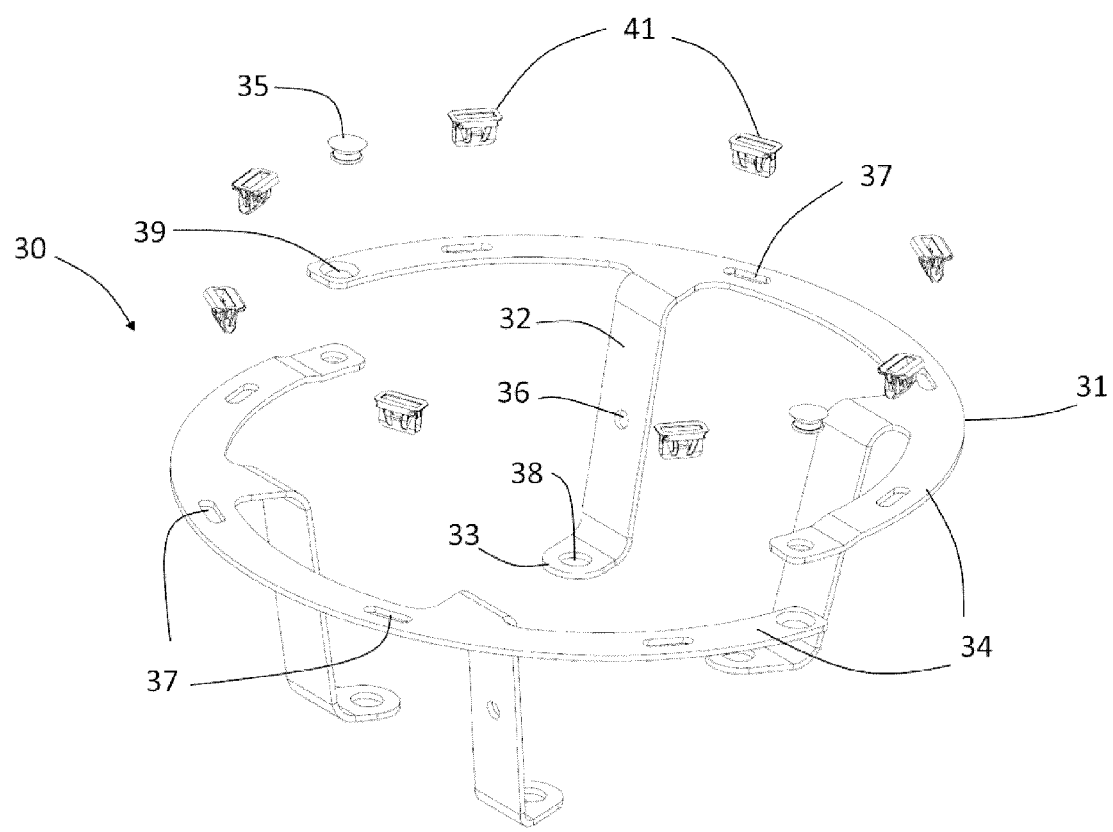
FIG. 5B shows an exploded view of the bracket of FIG. 5A.
Figure 5C:
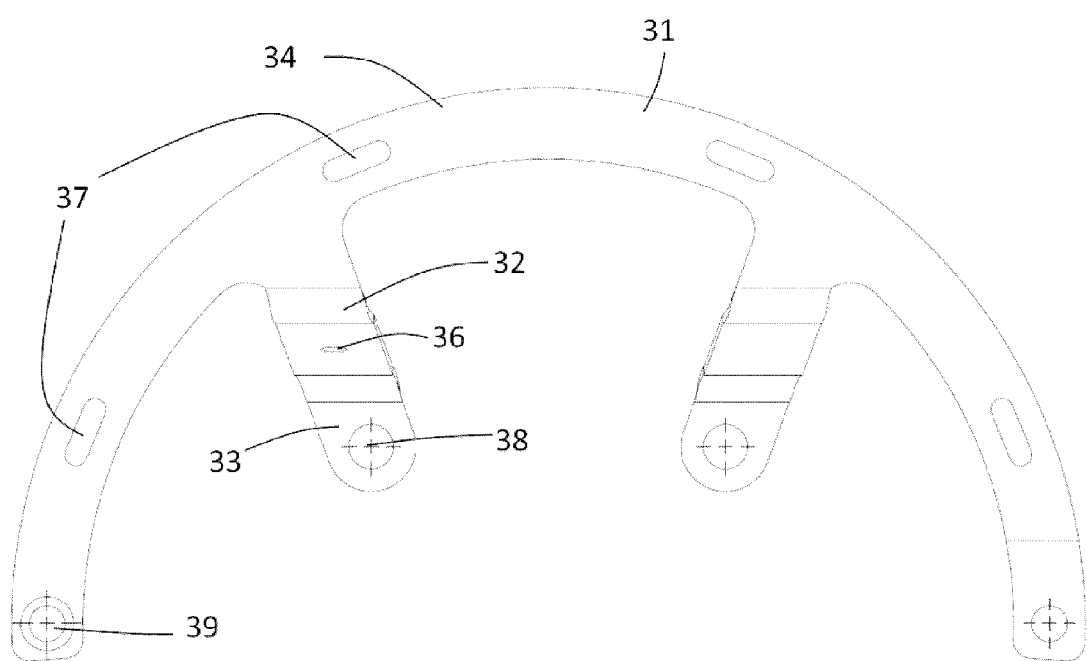
FIG. 5C shows an embodiment of a bracket component of the bracket of FIG. 5A.
Figure 5D:
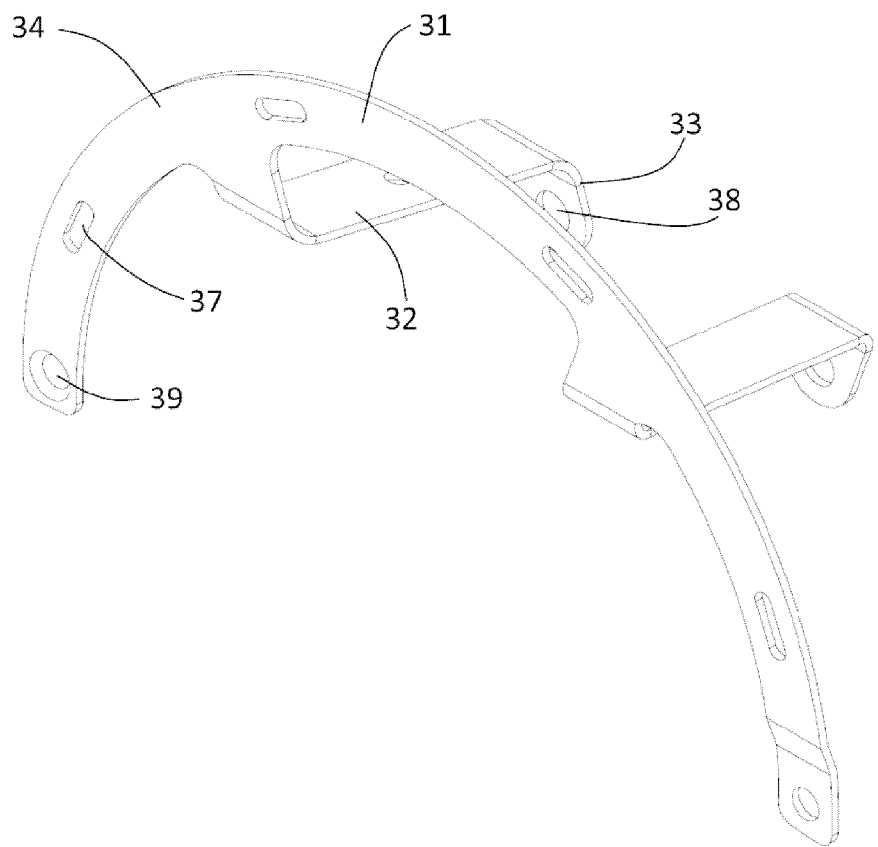
FIG. 5D shows an angled front view of the bracket component of FIG. 5C.
Figure 5E:
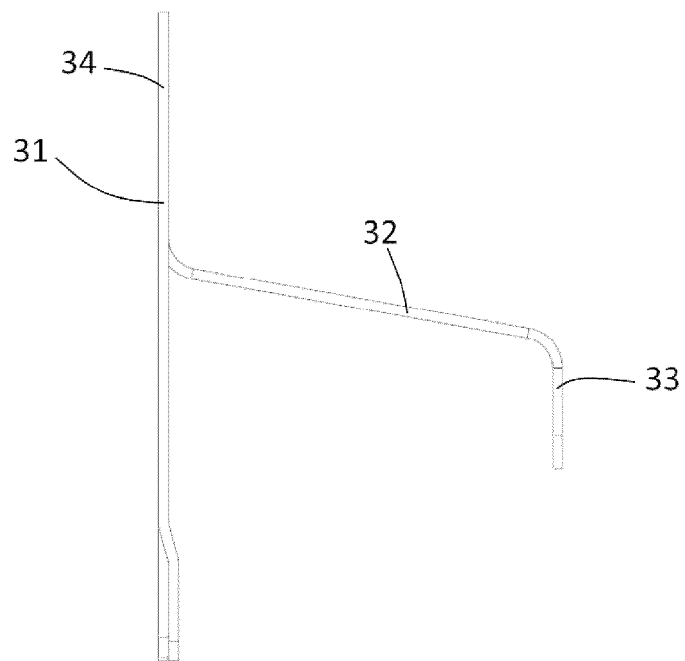
FIG. 5E shows a side view of the bracket component of FIG. 5C.
Figure 5F:
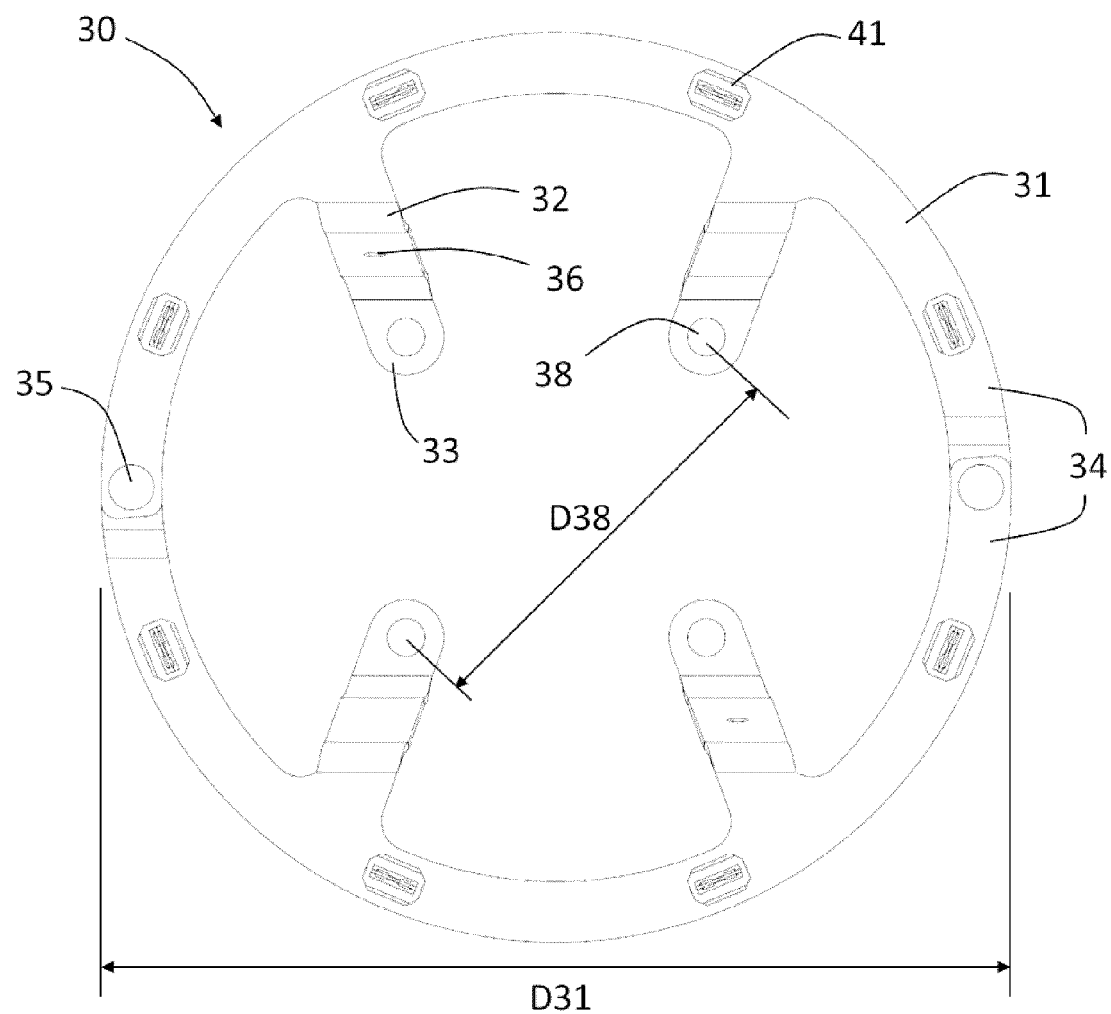
FIG. 5F shows a front view of the bracket of FIG. 5A.
Figure 5G:
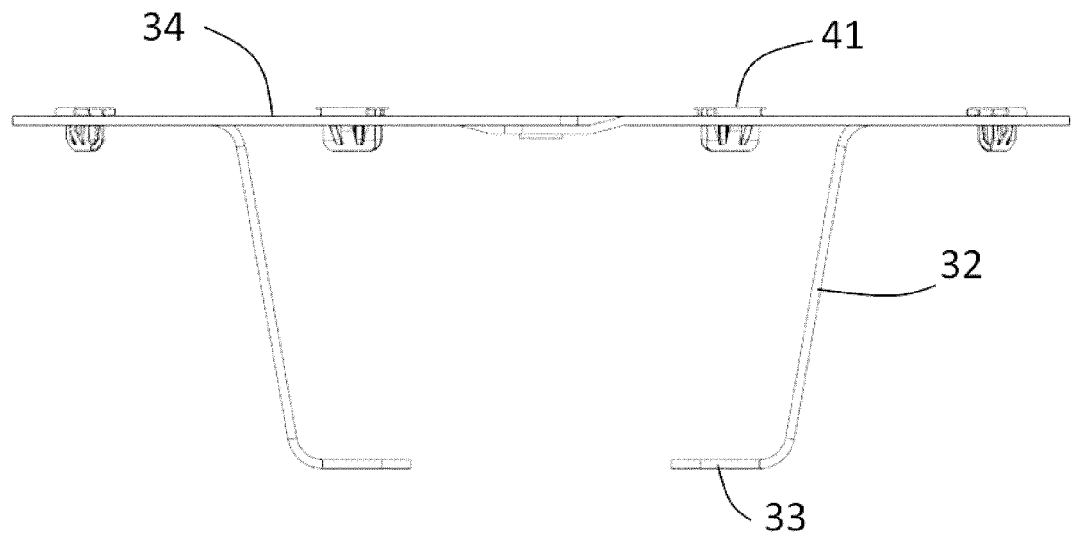
FIG. 5G shows a side view of the bracket of FIG. 5A.
Figure 5H:
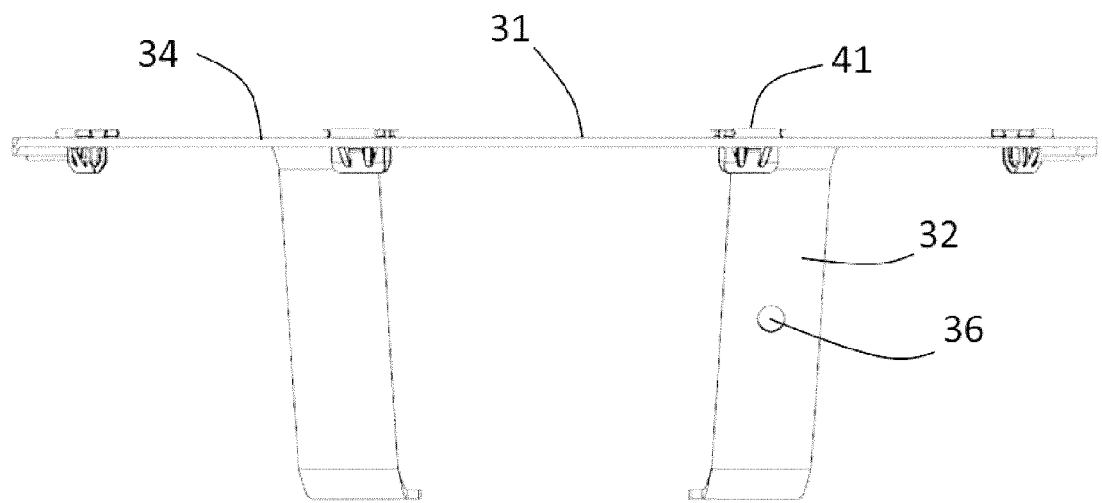
FIG. 5H shows a side view of the bracket of FIG. 5A.

As shown in FIGS. 5B-5D, the ring element 31 of the bracket 30 may comprise a plurality of holes/apertures 37 that correspond to the fastening extensions 14 on the outer ring 10. For example, if the outer ring 10 comprises 2, 3, 4, 5, 6, 7, 8, 9, or 10 fastening extensions 14 spaced equidistant apart along the outer ring 10, the bracket 30 may also comprise a corresponding number of holes 37 that can be aligned with the fastening extensions 14 when the bracket 30 and the outer ring 10 are coupled. In some embodiments, the bracket 30 may have more holes 37 than the outer ring 10. In some embodiments, the bracket 30 may have less holes 37 than the outer ring 10. The fastening extensions 14 can be coupled with the holes 37 using a fastening member 41. The fastening member may comprise any fastening method suitable for joining together two components, such as a clip, plastic tabs, an embossment, a screw-on fastener, a mechanical fastener, or a welded joint, and the fastening mechanism does not limit the disclosure. The fastening member can be permanently attached or resealable/removable. According to some embodiments, the fastening member 41 may be a self-retaining fastener, such as a Tinnerman® style clip (available from Tinnerman Palnut Engineered Products, LLC in Brunswick, Ohio).

As shown in FIGS. 5B-5D, the bracket components 34 may comprise holes 39 to facilitate the coupling of the bracket components 34 with the bracket component connector 35, e.g., a rivet, a clip, a nut-and-bolt, or any other suitable connector.

The bracket 30 may be configured to allow access to components of the wheel assembly 80 without removal of the bracket 30. For example, one or more of the legs 32 of the bracket 30 may comprise an access opening 36 for a tire air valve. The access opening 36 can act as a mounting point for an air valve extension 86 and can be configured to fit a standard size air valve 87 and air valve extension 86. When the wheel cover assembly 1 is in an assembled position, removing (i.e., decoupling) the inner cover 20 allows access to the tire air valve without the need to completely remove the wheel cover assembly 1. According to some embodiments, manual removal (i.e., decoupling) of the inner cover 20 allows for tool-free access to the tire air valve and other components of the wheel assembly 80.

According to some embodiments, the bracket has a depth L30 that may be configured to extend the ring element 31 to be approximately level with (or slightly below) the front surface of the wheel assembly 80. For example, the depth L30 of the bracket 30 can be such that when the wheel cover assembly 1 is in an assembled position, the outer ring 10 and inner cover 20 form a front surface that is approximately level with the front surface of the wheel assembly 80 and that provides an improved aerodynamic profile to the wheel assembly 80. (See also FIGS. 9B, 10B and 10C)

Figure 6A:
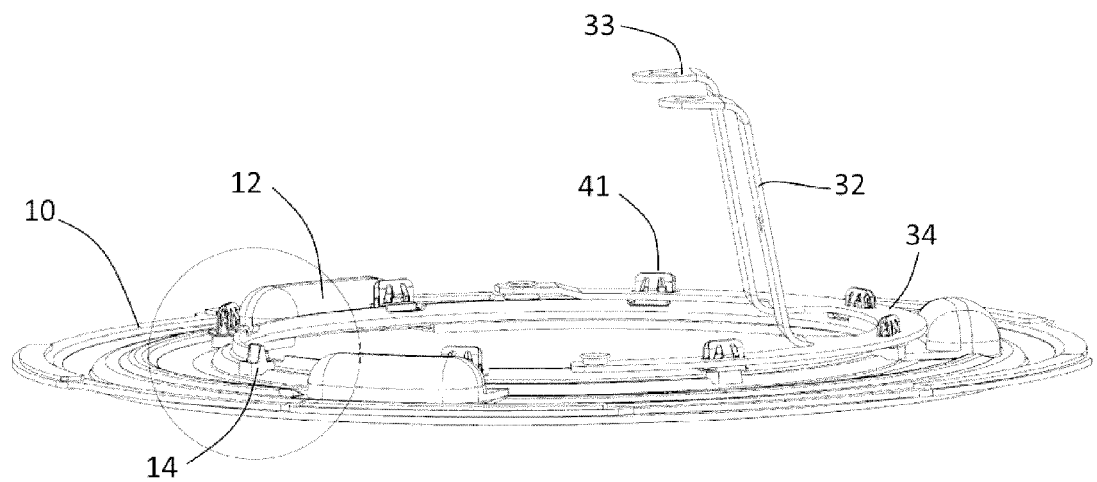
FIG. 6A shows an embodiment of a partially assembled outer ring and bracket component of the wheel cover assembly of FIG. 1.
Figure 6B:
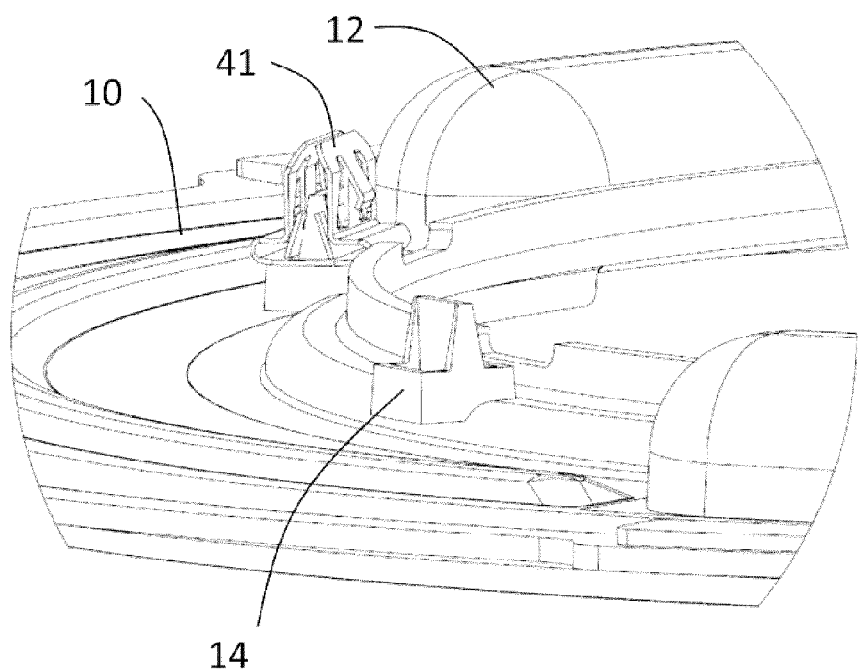
FIG. 6B shows a close-up view of an embodiment of a fastening extension of the outer ring of FIG. 6A.
Figure 6C:
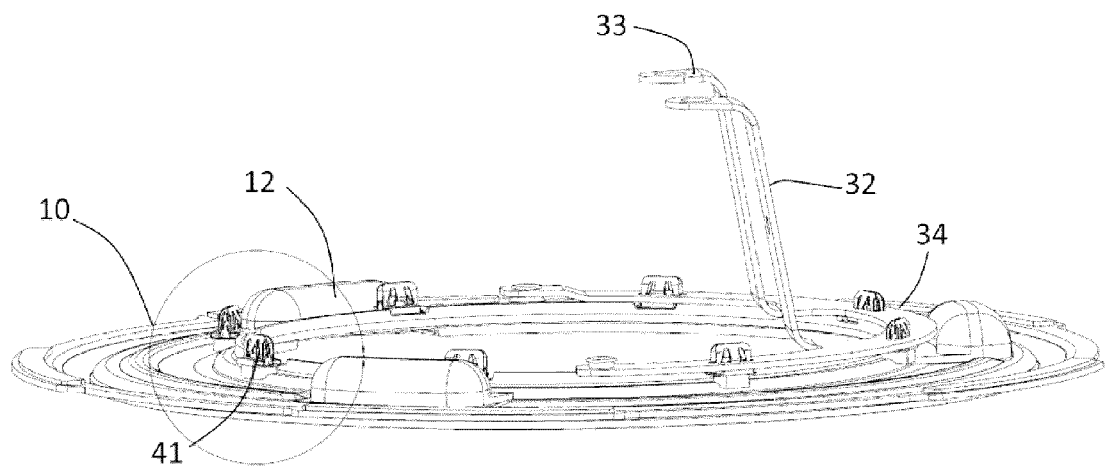
FIG. 6C shows an embodiment of a partially assembled outer ring and bracket component of the wheel cover assembly of FIG. 1.
Figure 6D:
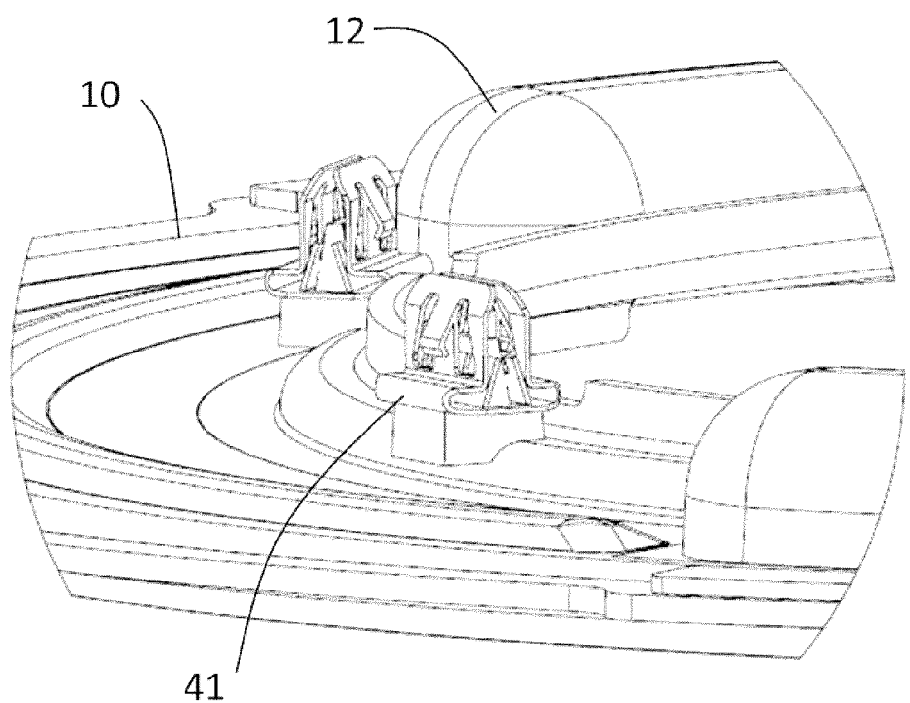
FIG. 6D shows a close-up view of an embodiment of a fastening member of the outer ring of FIG. 6C.
Figure 6E:
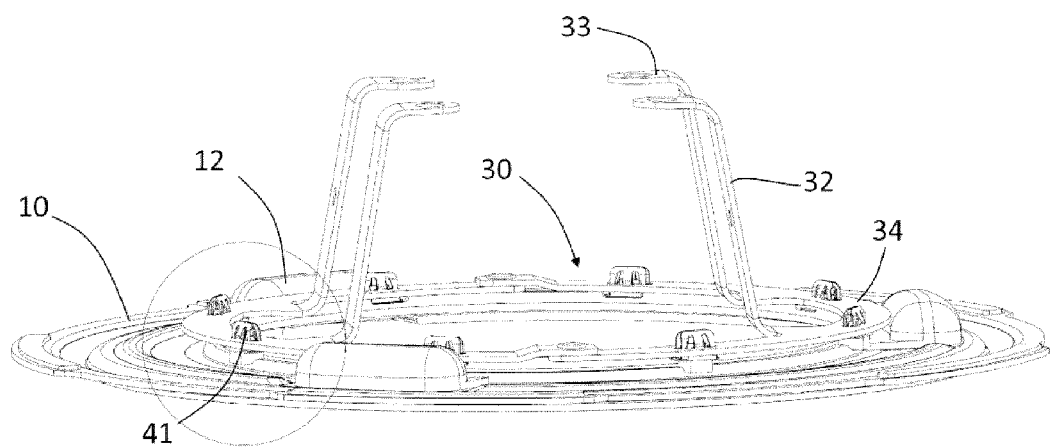
FIG. 6E shows an embodiment of a partially assembled outer ring and bracket of the wheel cover assembly of FIG. 1.
Figure 6F:
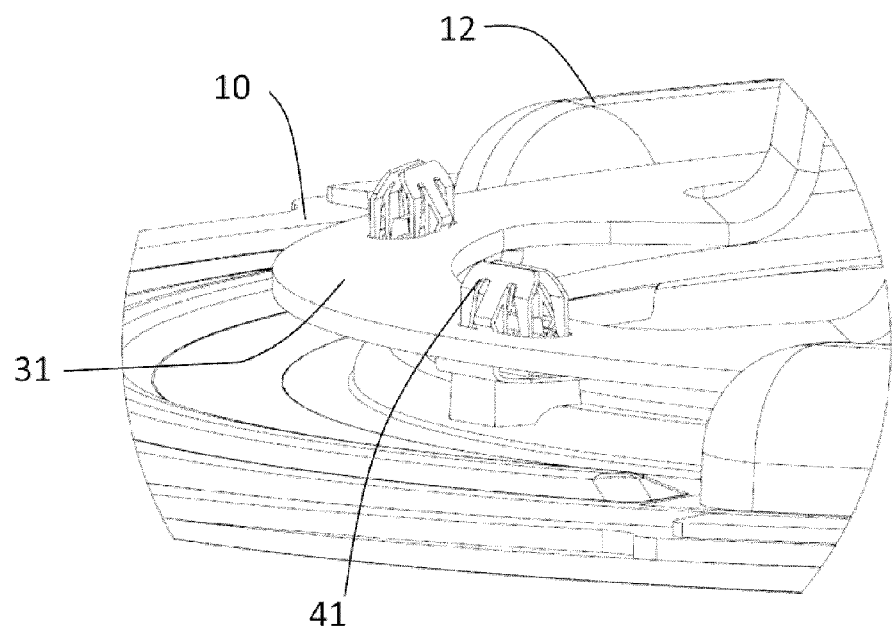
FIG. 6F shows a close-up view of an embodiment of a fastening member of the outer ring of FIG. 6E.
Figure 6G:
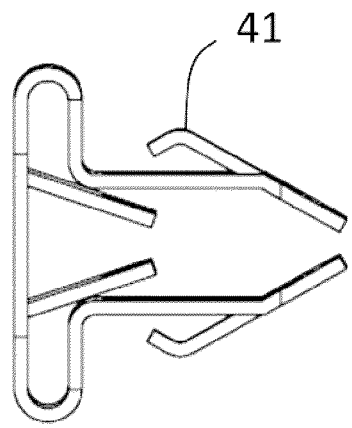
FIG. 6G, 6H and 6J show views of an embodiment of a fastening member of the wheel cover assembly of FIG. 1.
Figure 6H:
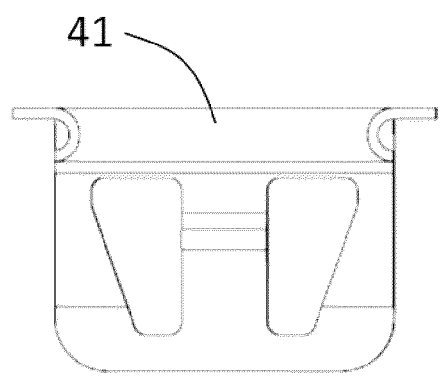
Figure 6J:
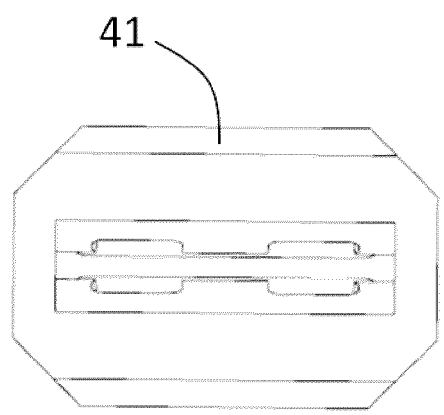

FIGS. 6A-11B show various examples of coupling the elements of the wheel cover assembly 1 and assembling the wheel cover assembly 1. FIGS. 6A-6G show embodiments of a partially assembled wheel cover assembly 1 including the outer ring 10 and one bracket component 34, connected with fastening members 41. In FIGS. 6A and 6B, one of the fastening extensions 14 of the outer ring 10 is visible. FIG. 6B shows a close-up view of the fastening extension 14. FIG. 6D shows a close-up view of an embodiment of a fastening extension 14 with a fastening member 41. FIG. 6F shows a close-up view of an embodiment of a fastening extension 14 where the outer ring 10 has been coupled with the bracket 30. The fastening extensions 14 and fastening members 41 may be configured such that the fastening member 41 can fit over and clip onto the fastening extension 14. Further, in some embodiments, the fastening members 41 and the holes 37 on the ring element 31 of the bracket 30 can be sized so that the fastening member 41 can connect with the holes 37. For example, the outer dimensions of the fastening member 41 can be such that the fastening member 41 can be snapped into place by contracting and pushing a part of the fastening member 41 through the hole 37. As seen in FIG. 6F and the various views of an embodiment shown in FIGS. 6G-6J, the fastening member 41 can have extensions or burs that hold the fastening member 41 in place once the burs have cleared the edges of the hole 37 on the ring element 31.

Figure 7A:
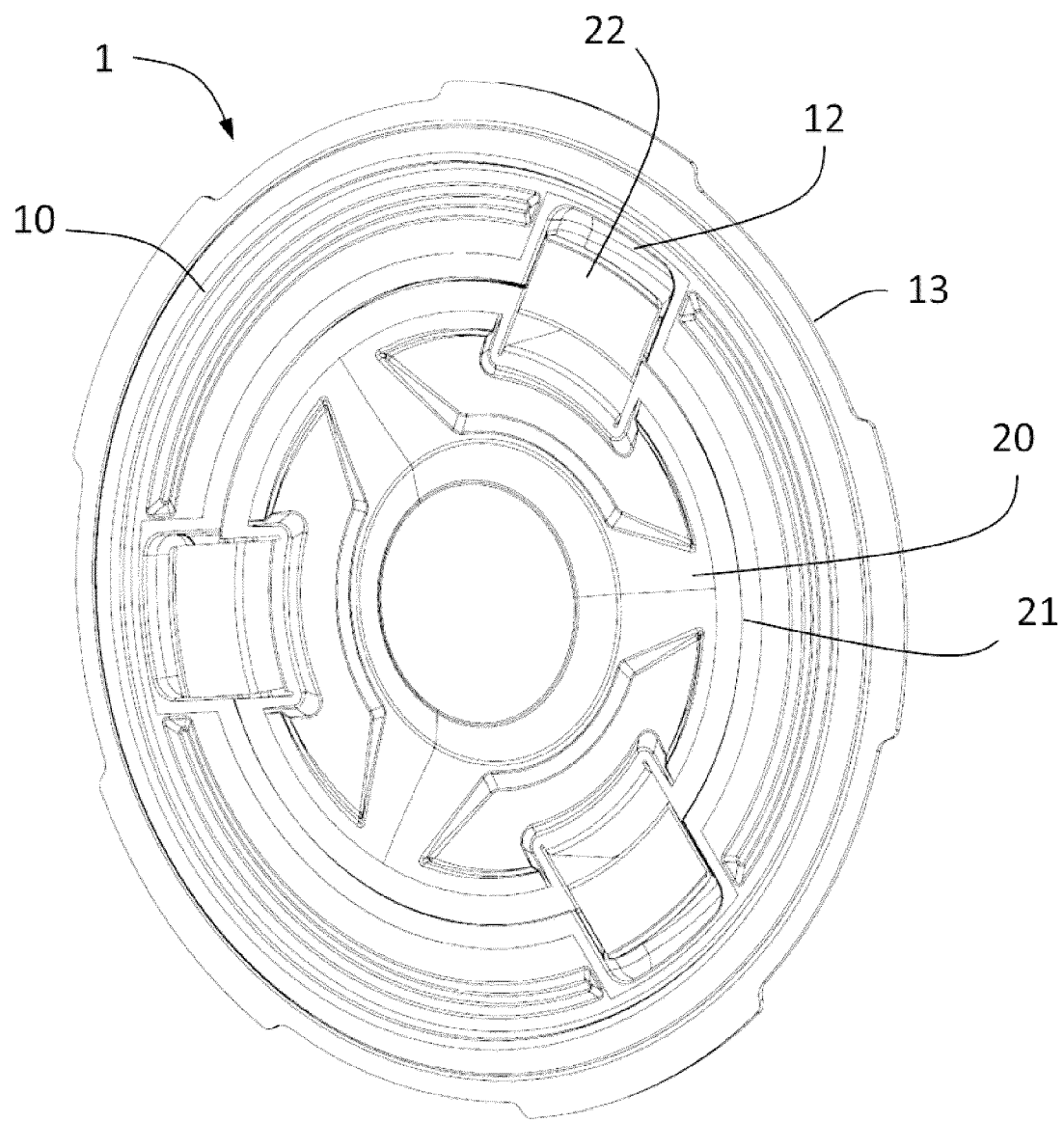
FIG. 7A shows an embodiment of the outer ring and inner cover of the wheel cover assembly of FIG. 1.
Figure 7B:
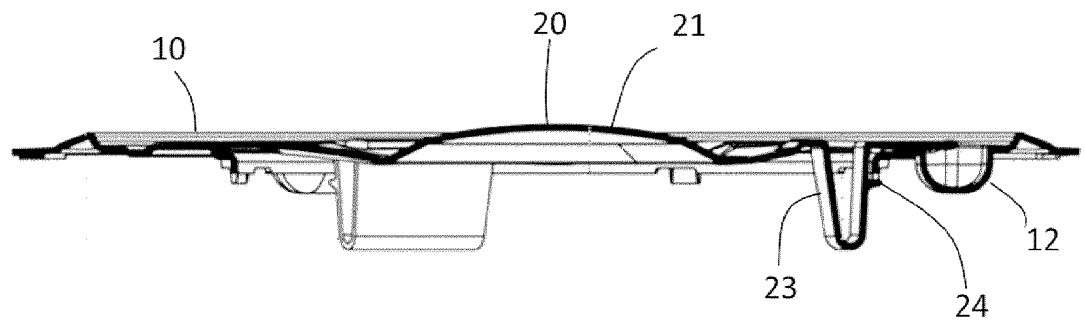
FIG. 7B shows a cross sectional view of the outer ring and inner cover of FIG. 7A.

FIGS. 7A and 7B show an embodiment of the outer ring 10 coupled with the inner cover 20. As seen in FIG. 7A, the number of recesses 12 in the outer ring 10 can be equal to the number of attachment mechanisms 22 in the inner cover 20. In some embodiments, the outer ring 10 comprises three recesses 12 and the inner cover 20 comprises three attachment mechanisms 22. When the inner cover 20 is coupled with the outer ring 10, the attachment mechanisms 22 can be aligned with the recesses 12 so that each recess 12 provides a grip space for the handle 25 of the corresponding attachment mechanism 22.

Figure 8:
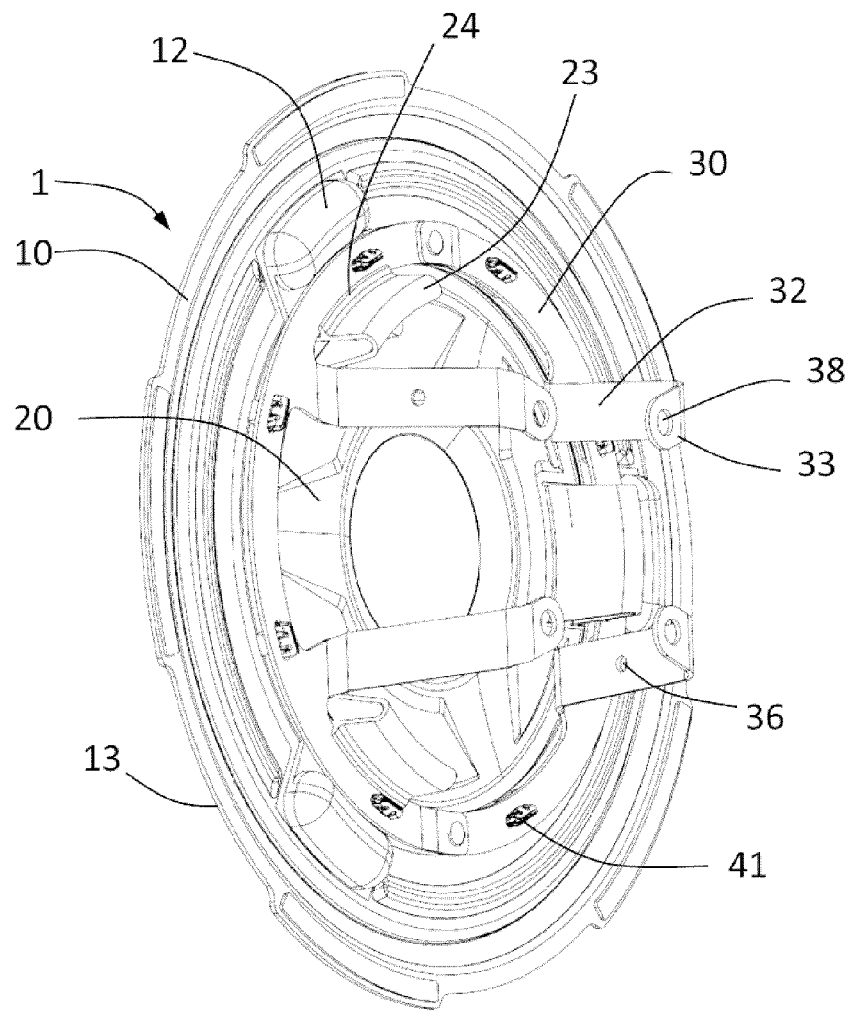
FIG. 8 shows an angled back view of the wheel cover assembly of FIG. 1.

FIG. 8 shows a back view of the wheel cover assembly 1, including the bracket 30, coupled with the outer ring 10 by fastening members 41, and the inner cover 20, coupled with the outer ring 10 and the bracket 30. The attachment mechanisms 22 can extend in a generally axial direction behind the inner cover 20, inside the ring element 31 of the bracket 30. In some embodiments, such as shown in FIG. 8, the catch 24 of the attachment mechanism 22 engages with the ring element 31, holding the inner cover 20 in place. The spring element 23 may exert a spring force on the catch 24, pushing the catch 24 radially outward. According to some embodiments, when the vehicle is in motion, a centrifugal force applies to the spring element 23 and catch 24, further pushing the second leg 232 of the spring element 23 and the catch 24 outward and securing the inner cover 20 in place.

Figure 9A:
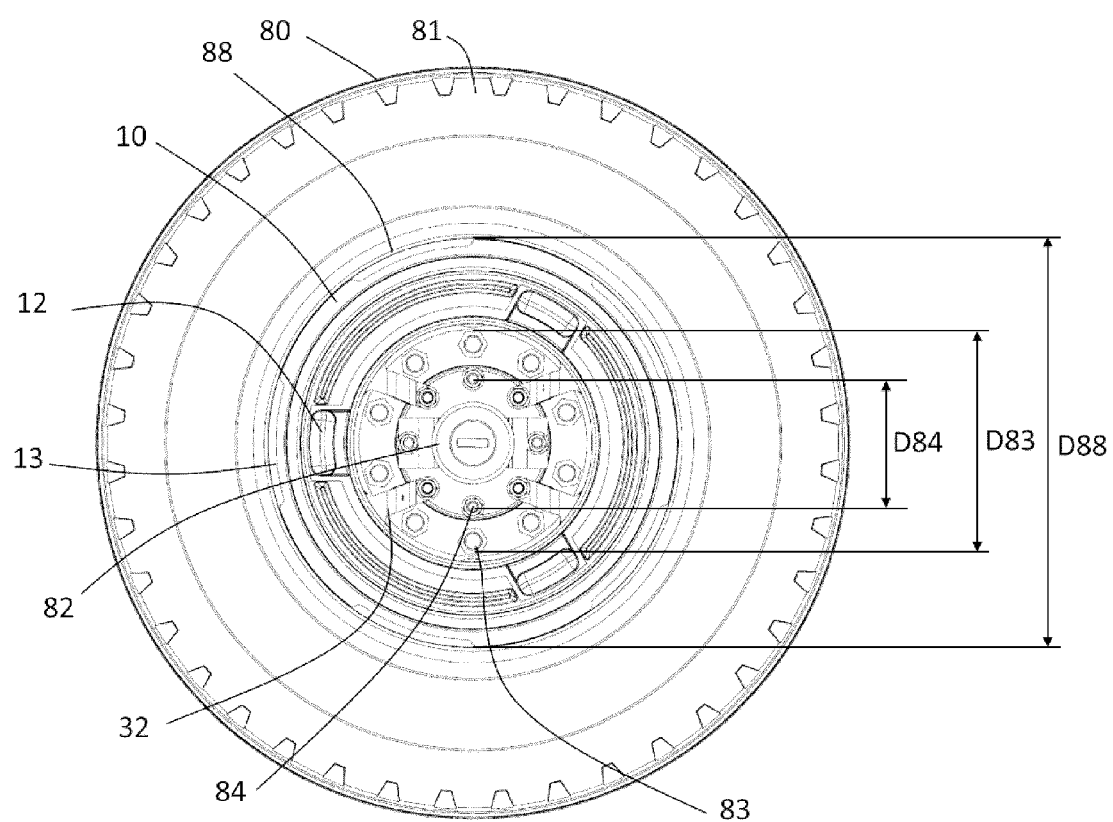
FIG. 9A shows an embodiment of the outer ring and bracket of the wheel cover assembly of FIG. 1 assembled on a wheel assembly of a vehicle.
Figure 9B:
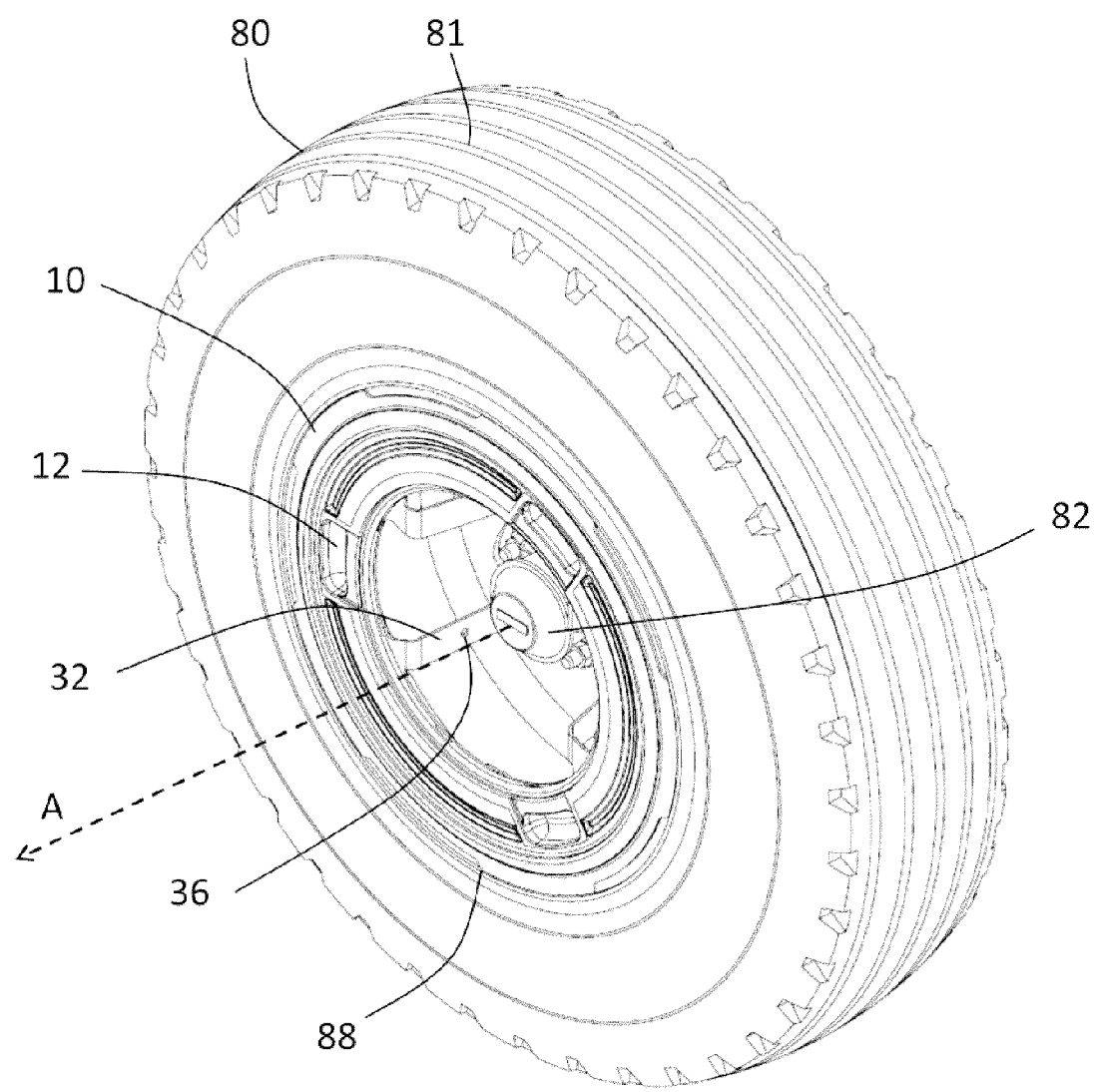
FIG. 9B shows an angled front view of the outer ring and bracket if FIG. 9A.
Figure 9C:
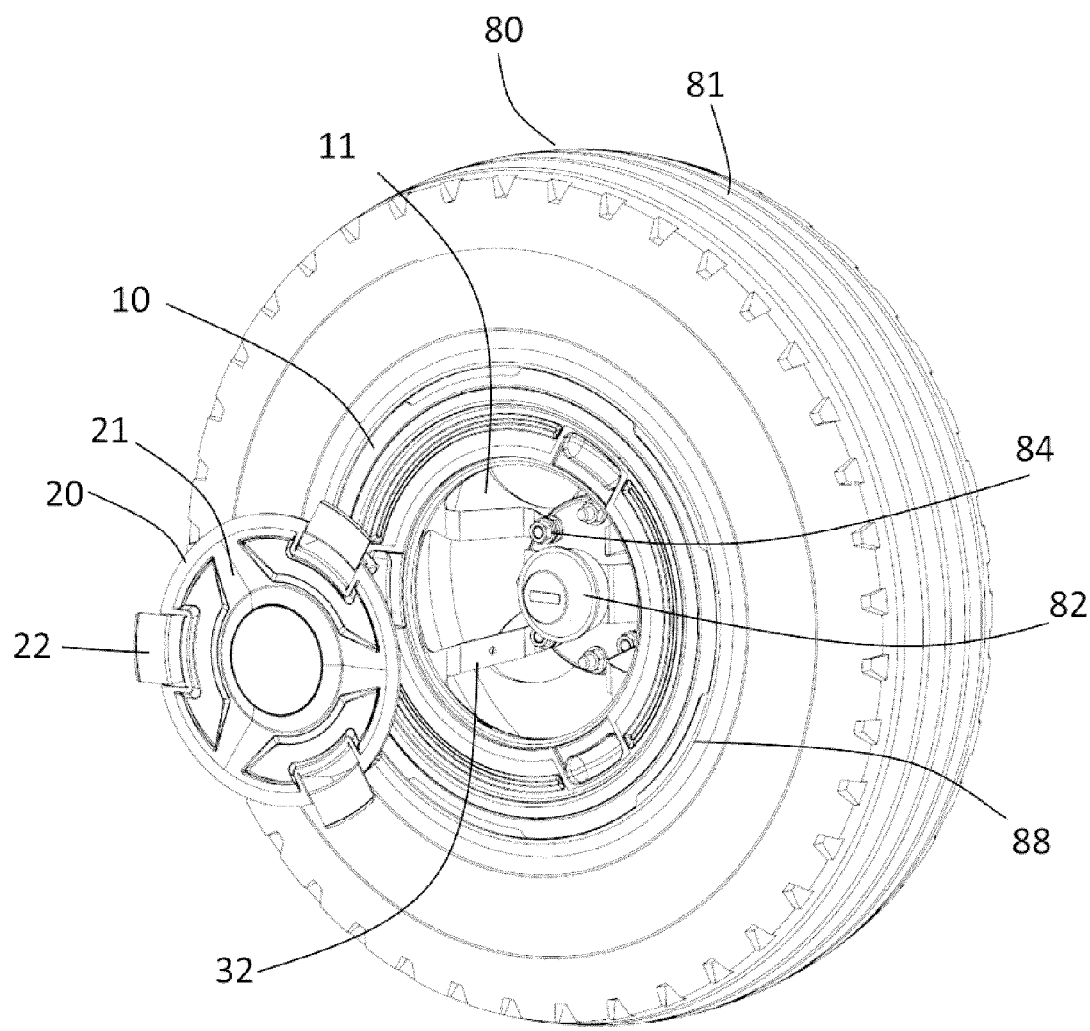
FIG. 9C shows an embodiment of the wheel cover assembly of FIG. 1 partially assembled on a wheel assembly of a vehicle.

FIGS. 9A-9C show an embodiment of the wheel cover assembly 1 partially assembled on a wheel assembly 80. As can be seen in FIG. 9A, the bracket 30 can be mounted on the wheel assembly 80 and can be secured in place with some of the inner lug nuts 84. According to some embodiments, the bracket 30 can be secured by the mounting holes 38 in the feet 33 of the bracket 30 using four of the inner lug nuts 84. At least one of the access openings 36 on the mounting legs 32 can be positioned so that it allows access to a tire air valve without removal of the bracket 30. The outer ring 10 can be coupled with the bracket 30 by aligning the fastening members 41 (attached to the fastening extensions 14 on the outer ring 10) with the holes 37 on the ring element 31 of the bracket 30 and pushing or "snapping" the outer ring 10 into place by engaging each of the fastening members 41 with a corresponding hole 37.

According to some embodiments, when the bracket 30 and the outer ring 10 are in an assembled position on the wheel assembly 80, the outer perimeter of the outer ring 10 can align with a rim of the wheel well 85 and the front surface of the outer ring 10 can be generally flush with the front surface of the wheel assembly 80. FIG. 9A also shows that when the wheel cover assembly 1 is in an assembled position without the inner cover 20 in place, the wheel cover assembly 1 can allow for access to the inner lug nuts 84, the outer lug nuts 83, and the hub 82 (which may comprise a hubodometer) of the wheel assembly 80. According to some embodiments, the outer lug nuts 83 can have a lug bolt pattern that has a diameter D83, and the diameter D83 can be smaller than the diameter of the opening in the outer ring 10 (i.e., second diameter D11).

As shown in FIG. 9C, the wheel cover assembly 1 can be fully assembled from a partially assembled state by securing the inner cover 20 onto the outer ring 10, thereby covering the center opening 11 of the outer ring 10. For example, the inner cover 20 can be pushed into place in an axial direction along axis A so that the catch 24 engages with the ring element 31 of the bracket 30 or the rim of the center opening 11 of the outer ring 10. As seen in FIG. 9B, axis A is a center axis of the wheel cover assembly 1 and is parallel to and aligned with the axle of the vehicle when the wheel cover assembly 1 in an assemble position.

FIG. 9C also shows that by simply removing the inner cover 20, the wheel cover assembly 1 allows for easy access to and a view of the interior components of the wheel well 85, such as the hub 82, the hubodometer, the outer lug nuts 83, the inner lug nuts 84, and the tire air valve. The wheel cover assembly 1, including the bracket 30 and the outer ring 10, is configured so that a tool (e.g., a lug wrench) can be used on the lug nuts (including outer lug nuts 83 and inner lug nuts 84) without interference by the bracket 30 or the outer ring 10. For example, the wheel cover assembly 1 allows for the inspection of the torque of the lug nuts by removing the inner cover 20 and applying the lug wrench onto each lug nut.

Figure 10A:
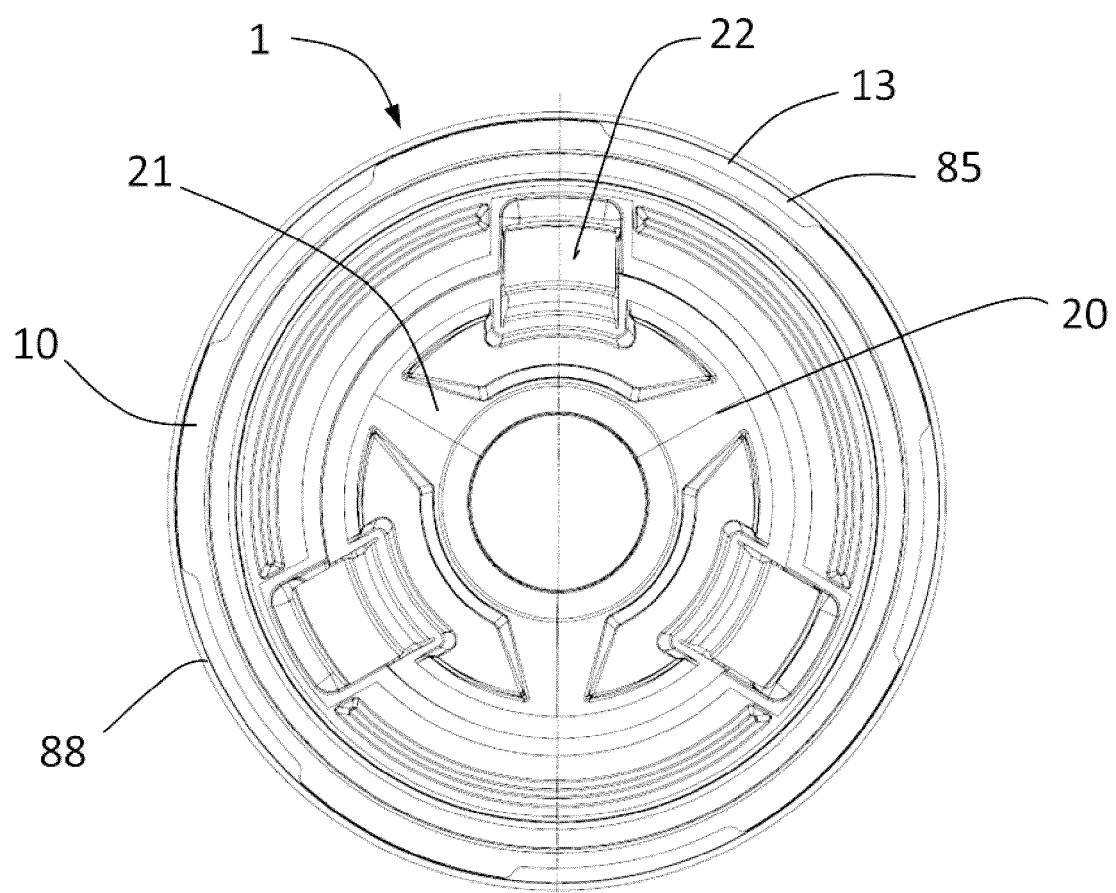
FIG. 10A shows an embodiment of the wheel cover assembly of FIG. 1 assembled on a wheel well of a wheel assembly of a vehicle.
Figure 10B:
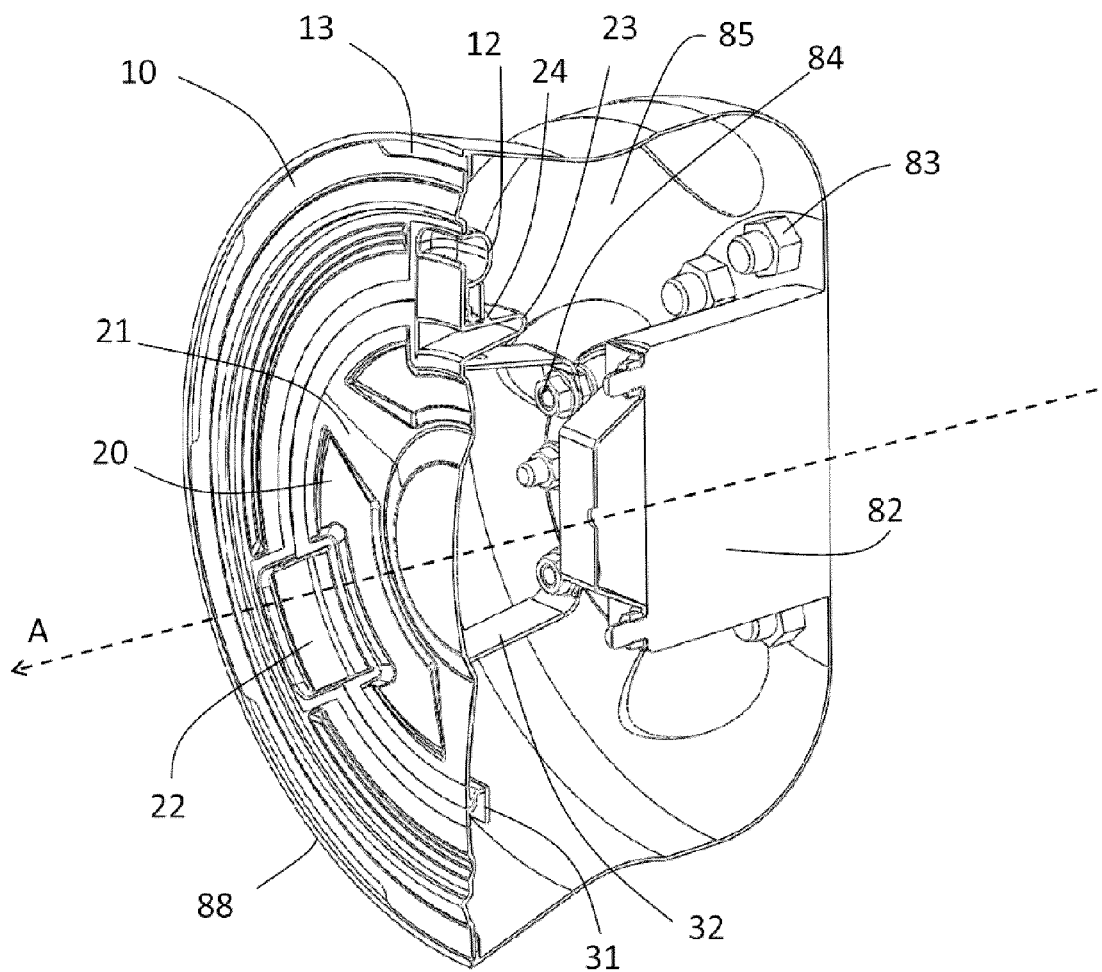
FIG. 10B shows a cross sectional view of the wheel cover assembly of FIG. 10A.
Figure 10C:
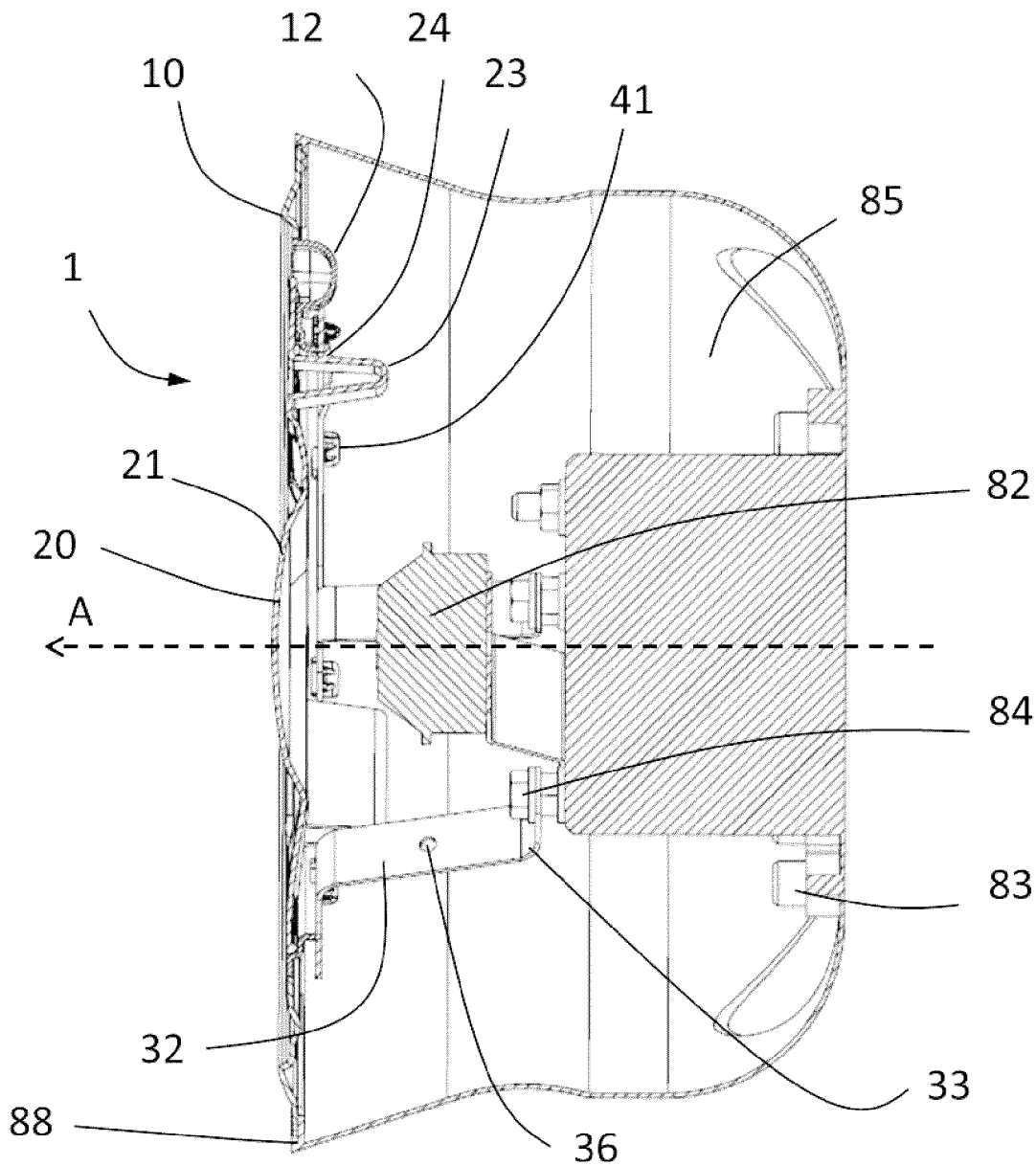
FIG. 10C shows a cross sectional side view of the wheel cover assembly of FIG. 10A.
Figure 10D:
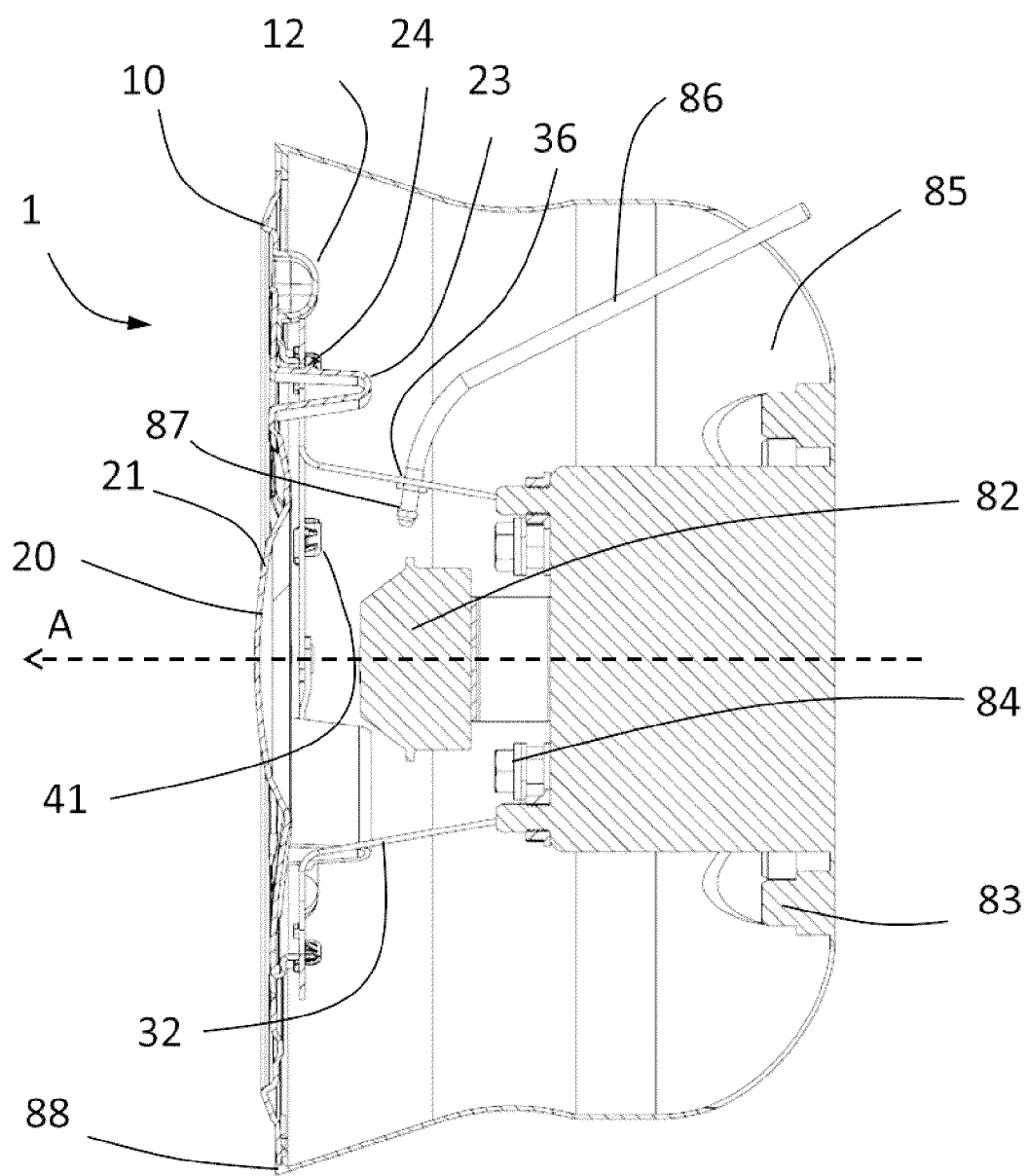
FIG. 10D shows a cross sectional side view of the wheel cover assembly of FIG. 10A with an air valve extension.

FIGS. 10A-10D show the wheel cover assembly 1 assembled with the wheel well 85 of the wheel assembly 80. FIG. 10A shows that the wheel cover assembly 1 substantially covers the wheel well 85, thus resulting in improved aerodynamics of the wheel assembly 80. When the inner cover 20 is in place, the wheel well 85 is mainly only accessible through the drainage feature 13. FIGS. 10B-10D show a cross sectional view of the wheel cover assembly 1 and the wheel well 85 cut along the axis A. When the wheel cover assembly 1 is in an assembled position, as in FIGS. 10A-10D, the inner cover 20 is secured in place by the catch 24 that engages the ring element 31 of the bracket 30. FIG. 10C illustrates an embodiment of the surface contour of the wheel cover assembly 1 that is substantially flush with the rim of the wheel well 85 and thus the wheel assembly 80. The wheel assembly 80 is shown without a tire valve extension in place. FIG. 10D shows another cross sectional view of the wheel cover assembly 2 and the wheel well 85 with an air valve extension 86 and air valve 87 in place. The air valve extension can be threaded through the access opening 36 so that the air valve 87 is accessible through the center opening 11 of the wheel cover assembly 1 when the inner cover 20 is removed. The air valve 87 can be secured in place at the access opening 36 by a nut. The air valve extension 86 connects the air valve 87 to the inner tire of the wheel assembly 80, extending through an opening in the wheel well. The air valve extension 86 can, for example, be made of a flexible material, such as a rubber hose covered by a braided material.

Figure 11A:
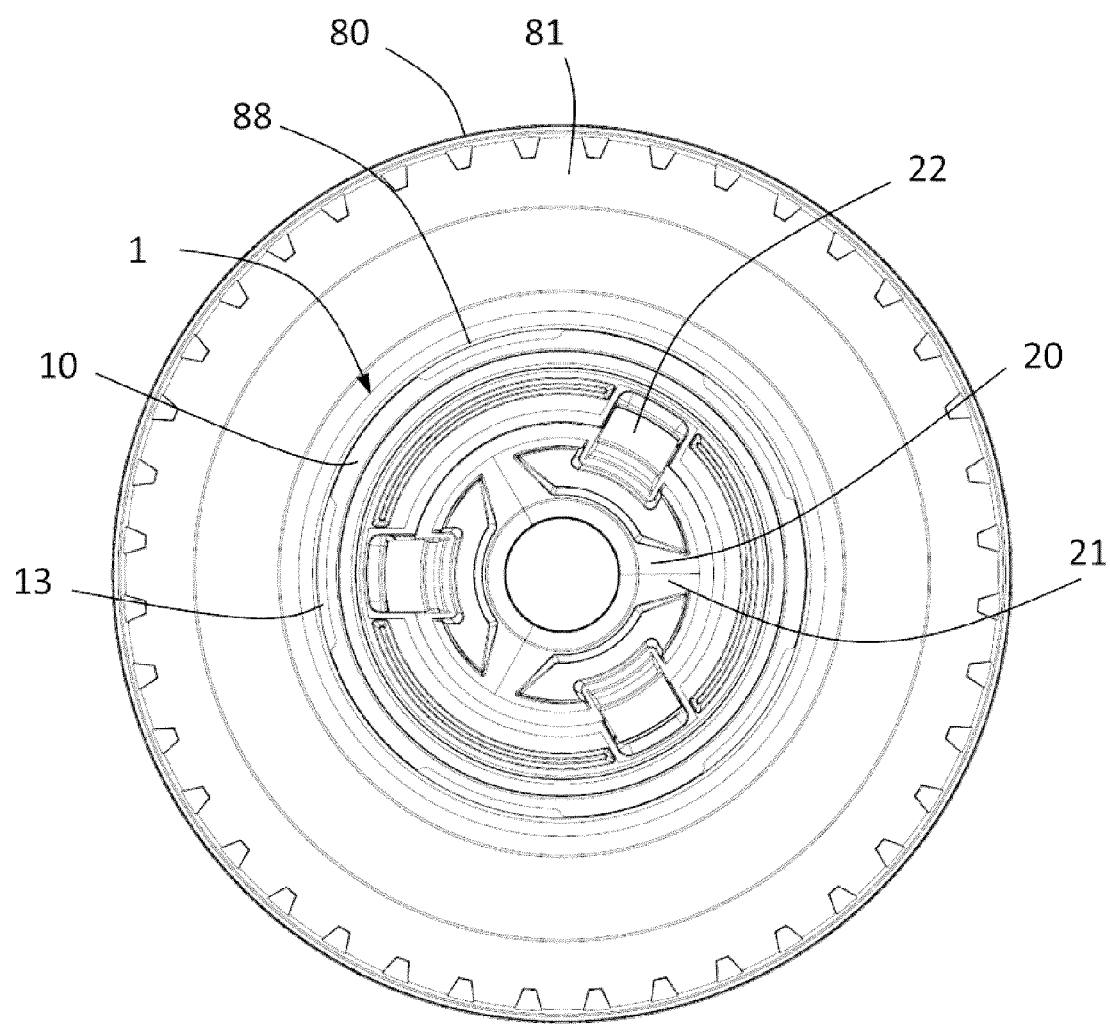
FIG. 11A shows an embodiment of the wheel cover assembly of FIG. 1 assembled on a wheel assembly of a vehicle.
Figure 11B:
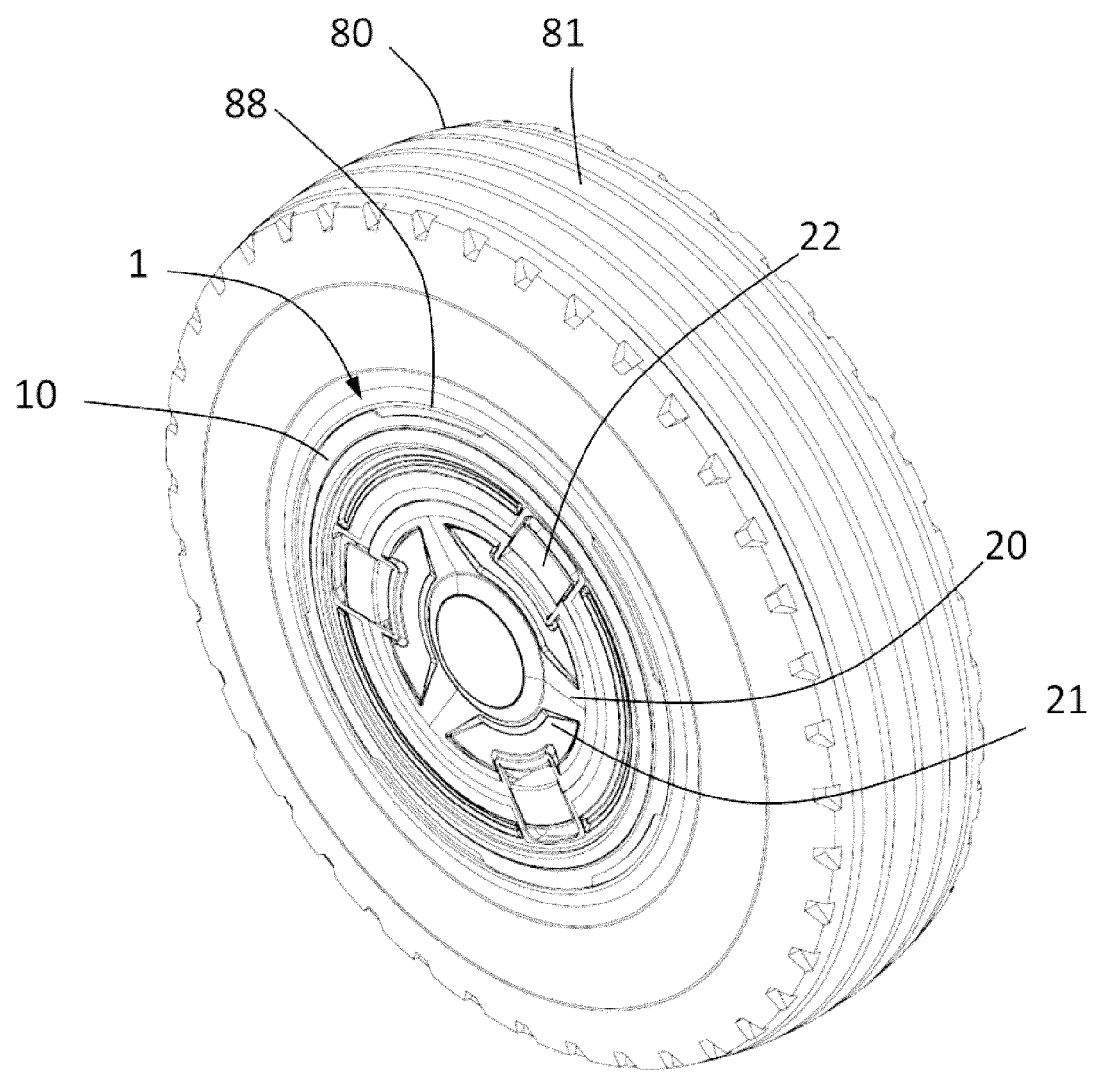
FIG. 11B shows an embodiment of the wheel cover assembly of FIG. 11A assembled on a wheel assembly of a vehicle.

FIGS. 11A and 11B show an embodiment of a fully assembled wheel cover assembly 1 and wheel assembly 80. As shown, the wheel cover assembly 1 can have a front surface that is substantially flush with the front surface of the wheel assembly 80 and provides the wheel assembly 80 with improved aerodynamics.

Figure 12:
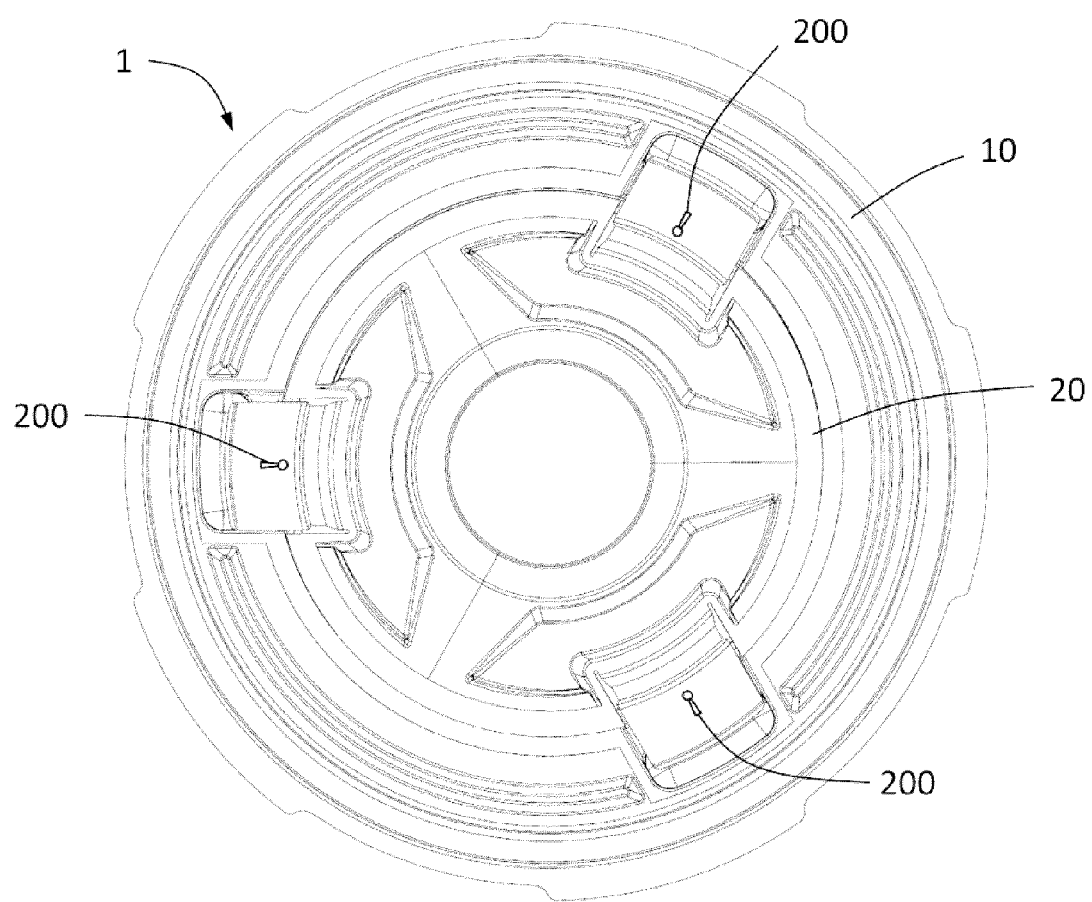
FIG. 12 shows an embodiment of the wheel cover assembly of FIG. 1 including a schematic depiction of a locking mechanism.

FIG. 12 shows a schematic, non-limiting depiction of an embodiment of the wheel cover assembly 1 that includes a locking mechanism 200. The locking mechanism 200 can be used to secure the wheel cover assembly 1 onto the wheel assembly 80. The locking mechanism 200 can be configured in any suitable way that prevents removal of the inner cover 20 without first unlocking the locking mechanism 16. For example, the locking mechanism 200 can prevent the movement of the handle portion 25, or can secure the inner cover 20 to another part of the wheel cover assembly 1 or the wheel assembly 80. The locking mechanism 200 may be used to prevent theft of the wheel cover assembly 1 or tampering with the wheel assembly 1. The locking mechanism 200 can be configured to be operated either with or without a key. The type of locking mechanism does not limit the disclosure.

According to some embodiments, the components of the wheel cover assembly 1 may be constructed of any suitable materials that provide the components with the described functionality. Suitable materials include, for example, metals, metal alloys, different types of plastics, fiber glass, carbon fiber, and combinations thereof. According to some embodiments, the bracket components 34 can be constructed of metal, such as steel. According to some embodiments, the outer ring 10 and inner cover 20 can be constructed of a plastic material, metal, or a combination of plastic and metal. The plastic material may comprise one or more types of plastics, such as thermoplastic polyolefins (e.g., polypropylene, polyethylene, block copolymer polypropylene, rubber) and optionally reinforcement materials, such as fiberglass, carbon fiber, and/or fillers.

From the foregoing description, it will be appreciated that an inventive wheel covers are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A wheel cover assembly for covering an interior portion of a wheel assembly of a vehicle, the wheel cover assembly comprising:
   an interface support configured to be mountable onto the wheel assembly;
   a cover support configured to be attachable to the interface support, the cover support defining an outer perimeter and a center opening passing completely through the cover support; and
   a cover comprising a main body and configured to be attachable to the cover support;
   wherein the outer perimeter of the cover support is configured to align with a rim of a wheel well and the cover is configured to cover the center opening of the cover support when the wheel cover assembly is in an assembled position and allow access to the wheel well when in a disassembled position;
   wherein the cover comprises at least one attachment mechanism to secure the cover to the cover support, the attachment mechanism comprising a spring element, a catch member, and a release handle;
   wherein the spring element is connected to the release handle and to the main body; and wherein the spring element biases the catch member to engage with the cover support to secure the cover to the cover support and movement of the handle disengages the catch member.

2. The wheel cover assembly of claim 1, wherein lug nuts connecting the wheel assembly to an axle are accessible when the cover is disassembled but are not accessible when the cover is assembled.

3. The wheel cover assembly of claim 1, wherein a tire air vent is accessible when the cover is disassembled but is not accessible when the cover is assembled.

4. The wheel cover assembly of claim 1, wherein:
the wheel assembly comprises a wheel mounted to an axle by a plurality of outer lug nuts having an outer lug bolt pattern with a first diameter and a plurality of inner lug nuts;
the center opening of the cover support has a second diameter that is greater than the first diameter; and
the main body of the cover has a third diameter that is greater than the second diameter and a center axis that is parallel to and aligned with the axle of the vehicle when the wheel cover assembly is installed on the wheel assembly.

5. The wheel cover assembly of claim 1, wherein the spring element of the at least one attachment mechanism has a first leg extending axially away from the main body and a second leg extending axially toward the main body, and wherein the second leg connects the first leg to the handle.

6. The wheel cover assembly of claim 1, wherein the spring element comprises a catch that engages with a portion of the cover support when the cover is coupled with the cover support.

7. The wheel cover assembly of claim 1, wherein the release handle is manually operable.

8. The wheel cover assembly of claim 7, wherein the cover is configured to be decoupled from the cover support by manually moving the release handle toward the center axis.

9. The wheel cover assembly of claim 1, wherein the at least one attachment mechanism includes a plurality of attachment mechanisms.

10. The wheel cover assembly of claim 9, wherein the plurality of attachment mechanisms are arranged circumferentially equidistant from each other.

11. The wheel cover assembly of claim 1, wherein the cover support comprises at least one recess that is aligned with the handle when the cover is coupled with the cover support.

12. The wheel cover assembly of claim 1, wherein the interface support comprises two or more mounting legs and a ring element.

13. The wheel cover assembly of claim 1, wherein the interface support comprises two or more interface support components.

14. The wheel cover assembly of claim 4, wherein the interface support is mounted on the wheel assembly with at least some of the inner or outer lug nuts.

15. The wheel cover assembly of claim 1, wherein the cover support is attachable to the interface support with fastening members.

16. The wheel cover assembly of claim 15, wherein the fastening members attach via a plurality of fastening extensions.

17. The wheel cover assembly of claim 1, wherein the cover support comprises a drainage feature.

18. The wheel cover assembly of claim 1, wherein the interface support comprises an access opening for a tire air valve.

19. The wheel cover assembly of claim 1, wherein the wheel cover assembly comprises a locking mechanism.

* * * * *